United States Patent
Zhang et al.

(10) Patent No.: US 11,228,908 B2
(45) Date of Patent: Jan. 18, 2022

(54) DATA TRANSMISSION METHOD AND RELATED DEVICE AND SYSTEM

(71) Applicant: HUAWEI TECHNOLOGIES CO., LTD., Shenzhen (CN)

(72) Inventors: Bo Zhang, Shenzhen (CN); Lu Gan, Shenzhen (CN); Rong Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 436 days.

(21) Appl. No.: 16/400,032

(22) Filed: Apr. 30, 2019

(65) Prior Publication Data
US 2019/0261167 A1   Aug. 22, 2019

Related U.S. Application Data

(63) Continuation of application No. PCT/CN2017/090317, filed on Jun. 27, 2017.

(30) Foreign Application Priority Data

Oct. 31, 2016   (CN) .......................... 201610942360.2

(51) Int. Cl.
*H04W 12/00* (2021.01)
*H04W 12/04* (2021.01)
(Continued)

(52) U.S. Cl.
CPC .......... *H04W 12/06* (2013.01); *H04L 63/0869* (2013.01); *H04W 12/033* (2021.01);
(Continued)

(58) Field of Classification Search
CPC ............... H04L 63/0869; H04L 9/3242; H04L 2209/80; H04W 12/06; H04W 12/033;
(Continued)

(56) References Cited

U.S. PATENT DOCUMENTS

2004/0010545 A1 *   1/2004  Pandya ................... H04L 67/34
                                                        709/203
2011/0249649 A1    10/2011  Pulugurta
(Continued)

FOREIGN PATENT DOCUMENTS

CN    101127768 A    2/2008
CN    101510825 A    8/2009
(Continued)

OTHER PUBLICATIONS

Chinese Office Action issued in corresponding Chinese Application No. 201610942360.2, dated May 18, 2021, pp. 1-5.
(Continued)

*Primary Examiner* — Joseph P Hirl
*Assistant Examiner* — Thomas A Gyorfi
(74) *Attorney, Agent, or Firm* — Hauptman Ham, LLP

(57) ABSTRACT

Embodiments of the present invention disclose a data transmission method and a related device and system. The system includes an access network device AN and user equipment UE. The AN is configured to receive a base key sent by a key management device in a core network, where the base key is a key generated from two-way authentication between the UE and the core; the AN and the UE are configured to process the base key according to a preset rule to generate an air interface protection key; the UE is configured to: protect a target field in an uplink protocol data unit PDU by using the air interface protection key; and the AN is configured to parse the target field in the uplink protocol data unit by using the air interface protection key.

20 Claims, 11 Drawing Sheets

(51) Int. Cl.
  *H04W 12/06* (2021.01)
  *H04W 12/10* (2021.01)
  *H04L 29/06* (2006.01)
  *H04W 28/06* (2009.01)
  *H04W 12/08* (2021.01)
  *H04W 12/033* (2021.01)
  *H04W 12/041* (2021.01)
  *H04W 12/069* (2021.01)
  *H04W 12/106* (2021.01)
  *H04L 9/32* (2006.01)

(52) U.S. Cl.
  CPC ....... *H04W 12/041* (2021.01); *H04W 12/069* (2021.01); *H04W 12/08* (2013.01); *H04W 12/106* (2021.01); *H04W 28/06* (2013.01); *H04L 9/3242* (2013.01); *H04L 2209/80* (2013.01)

(58) Field of Classification Search
  CPC ............. H04W 12/041; H04W 12/069; H04W 12/106; H04W 28/06; H04W 12/08; H04W 12/04
  See application file for complete search history.

(56) References Cited

U.S. PATENT DOCUMENTS

| | | | |
|---|---|---|---|
| 2014/0294179 A1 | 10/2014 | Sammour et al. | |
| 2015/0124708 A1* | 5/2015 | Blankenship | H04W 12/084 370/329 |
| 2016/0224790 A1* | 8/2016 | Gupta | G06F 21/52 |
| 2016/0262021 A1* | 9/2016 | Lee | H04L 63/0807 |
| 2016/0285834 A1 | 9/2016 | Lee et al. | |
| 2016/0373591 A1* | 12/2016 | Sharma | H04M 15/8072 |

FOREIGN PATENT DOCUMENTS

| | | | |
|---|---|---|---|
| CN | 101534236 A | 9/2009 | |
| CN | 102056159 A | 5/2011 | |
| CN | 102394749 A | 3/2012 | |
| CN | 102439919 A | 5/2012 | |
| CN | 102484844 A | 5/2012 | |
| CN | 104704866 A | 6/2015 | |
| CN | 105553981 A | 5/2016 | |
| EP | 2487947 A1 | 8/2012 | |
| JP | 2008547257 A | 12/2008 | |
| JP | 2015532791 A | 11/2015 | |
| WO | 2011039571 A1 | 4/2011 | |
| WO | 2011127253 A1 | 10/2011 | |

OTHER PUBLICATIONS

3GPP TR 23.799 V1.0.2; 3rd Generation Partnership Project;Technical Specification Group Services and System Aspects;Study on Architecture for Next Generation System; (Release 14); Sep. 2016; total 423 pages.

* cited by examiner

DATA TRANSMISSION METHOD AND RELATED DEVICE AND SYSTEM

CROSS-REFERENCE TO RELATED APPLICATIONS

This application is a continuation of International Application No. PCT/CN2017/090317, filed on Jun. 27, 2017, which claims priority to Chinese Patent Application No. 201610942360.2, filed on Oct. 31, 2016. The disclosures of the aforementioned applications are hereby incorporated by reference in their entireties.

TECHNICAL FIELD

The present invention relates to the field of computer technologies, and in particular, to a data transmission method and a related device and system.

BACKGROUND

Wireless communications technologies have become essential in people's life. While communication becomes convenient, there are potential security and privacy risks. Air interface transmission is a key feature of wireless communication. A corresponding protection mechanism needs to be formulated to encrypt content transmitted over an air interface to protect the transmitted content from eavesdropping. In Long Term Evolution (LTE), a security protection mechanism for information from user equipment (UE) to the Internet is a hop-by-hop mechanism. To be specific, all information in a session is encrypted segment by segment for protection. However, an intermediate node through which the information is transmitted can obtain plaintext of the information. Consequently, the information cannot be protected from eavesdropping by the intermediate node. A person skilled in the art proposes an end-to-end protection mechanism for protection from eavesdropping by an intermediate node. The end-to-end protection mechanism is, for example, an end-to-end protection mechanism between UE and a core network (CN) and an end-to-end protection mechanism between UE and an Internet server.

The end-to-end protection mechanism between UE and a CN is In some embodiments as follows: When session data is transmitted between UE and a network element (for example, a control network element, an operator server, or a user plane-gateway) in a CN, an uplink protocol data unit (PDU) is directly encrypted by the UE and decrypted by the network element in the CN, and a downlink protocol data unit is directly encrypted by the network element in the CN and decrypted by the UE. The uplink protocol data unit and the downlink protocol data unit may be transmitted without being encrypted and decrypted by an intermediate node (for example, an access network (AN)) between the UE and the CN, so that interception by the intermediate node is avoided. FIG. 1 is a schematic diagram of a scenario of an end-to-end protection mechanism in the prior art. FIG. 1 shows UE, an AN, a control plane-authentication unit (CP-AU), a user plane-gateway (UP-GW), and an Internet server. A communication procedure of the UE in a network is as follows:

Step S101: The UE sends an access request to the AN by using an air interface technology, where transmission between the UE and the AN is in an air interface stage.

Step S102: The AN receives the access request and sends the access request to the CP-AU in a CN.

Step S103: The UE and the CP-AU perform two-way authentication.

Step S104: Establish a session between the UE and the CN after the UE and the CP-AU are mutually authenticated.

Step S105: The UE and the UP-GW in the CN transmit protocol data units based on the session and protect the transmitted protocol data units by using the end-to-end protection mechanism. To be specific, an uplink protocol data unit is encrypted by the UE and decrypted by the UP-GW, and a downlink protocol data unit is encrypted by the UP-GW and decrypted by the UE. An intermediate node AN between the UE and the UP-GW is responsible for transferring the uplink protocol data unit and the downlink protocol data unit but does not perform encryption and decryption operations, so that content between the UE and the UP-GW is protected from eavesdropping by the AN.

However, the end-to-end protection mechanism usually protects a payload part rather than a header part of a protocol data unit because the intermediate node needs to read information (for example, a session ID, an IMSI, and a bearer identifier) used to identify a session from a header of the protocol data unit, to use the information to determine how to forward the protocol data unit. The information used to identify a session is not encrypted, and therefore can be easily obtained by an attacker in an air interface transmission stage and used to track the session, posing a threat to security of the session.

SUMMARY

Embodiments of the present invention disclose a data transmission method and a related device and system, to prevent a session between UE and a target node from being attacked.

According to a first aspect, an embodiment of the present invention provides a communications system. The communications system includes an access network device AN and user equipment UE, where the AN is configured to receive a base key sent by a key management device in a core network, where the base key is a key generated from two-way authentication between the UE and the core network or a key derived from the key generated from the two-way authentication; the AN and the UE are both configured to process the base key according to a preset rule to generate an air interface protection key; the UE is further configured to: protect a target field in an uplink protocol data unit PDU by using the air interface protection key, and send the uplink protocol data unit with the protected target field to the AN, where the target field includes information used to identify a session between the UE and a target node, and data of the session between the target node and the UE needs to pass through the AN during transmission; and the AN is configured to: receive the uplink protocol data unit, and parse the target field in the uplink protocol data unit by using the air interface protection key.

By running the foregoing system, the UE and the AN negotiate the air interface protection key in advance, and then use the air interface protection key to protect a field that is included in a protocol data unit and that includes information used to identify a session between the UE and a user plane-gateway in the core network, so that an attacker cannot easily obtain the information used to identify the session between the UE and the user plane-gateway in the core network in an air interface stage, and the attacker cannot determine the session based on the information, thereby preventing the session from being attacked.

With reference to the first aspect, in a first possible implementation of the first aspect, the AN is configured to: protect a target field in a downlink protocol data unit by using the air interface protection key, and send the downlink protocol data unit with the protected target field to the UE; and the UE is configured to: receive the downlink protocol data unit, and parse the target field in the downlink protocol data unit by using the air interface protection key.

With reference to the first possible implementation of the first aspect, in a second possible implementation of the first aspect, the protecting the target field in the downlink protocol data unit by using the air interface protection key is In some embodiments: protecting the target field in the downlink protocol data unit by using the air interface protection key according to a rule defined in an air interface policy obtained in advance, where a use rule of a key is defined in the air interface policy; and the parsing the target field in the downlink protocol data unit by using the air interface protection key is In some embodiments: parsing the target field in the downlink protocol data unit by using the air interface protection key according to the rule defined in the air interface policy obtained in advance.

With reference to the first aspect or the first possible implementation of the first aspect or the second possible implementation of the first aspect, in a third possible implementation of the first aspect, the protecting the target field in the uplink protocol data unit PDU by using the air interface protection key is In some embodiments: protecting the target field in the uplink protocol data unit by using the air interface protection key according to a rule defined in an air interface policy obtained in advance, where a use rule of a key is defined in the air interface policy; and the parsing the target field in the uplink protocol data unit by using the air interface protection key is In some embodiments: parsing the target field in the uplink protocol data unit by using the air interface protection key according to the rule defined in the air interface policy obtained in advance.

With reference to the second possible implementation of the first aspect or the third possible implementation of the first aspect, in a fourth possible implementation of the first aspect, the AN is configured to receive an initial security policy from the core network, where a generation rule of a key used in a target session is defined in the initial security policy, and the target session is a session between the target node and the UE; the AN is configured to generate the air interface policy according to the initial security policy; the AN is configured to send the air interface policy to the UE; and the UE is configured to receive the air interface policy.

With reference to the first aspect or the first possible implementation of the first aspect or the second possible implementation of the first aspect or the third possible implementation of the first aspect or the fourth possible implementation of the first aspect, in a fifth possible implementation of the first aspect, the UE is further configured to determine whether a protocol data unit payload PDU payload field in the uplink protocol data unit is protected; and if the protocol data unit payload PDU payload field in the uplink protocol data unit is not protected, the UE is configured to protect the uplink protocol data unit by using the air interface protection key; or if the protocol data unit payload PDU payload field in the uplink protocol data unit is protected, the UE is configured to perform the operation of protecting a target field in an uplink protocol data unit by using the air interface protection key.

With reference to the first aspect or the first possible implementation of the first aspect or the second possible implementation of the first aspect or the third possible implementation of the first aspect or the fourth possible implementation of the first aspect or the fifth possible implementation of the first aspect, in a sixth possible implementation of the first aspect, the AN is further configured to determine whether a protocol data unit payload PDU payload field in the downlink protocol data unit is protected; and if the protocol data unit payload PDU payload field in the downlink protocol data unit is not protected, the AN is configured to protect the downlink protocol data unit by using the air interface protection key; or if the protocol data unit payload PDU payload field in the downlink protocol data unit is protected, the AN is configured to perform the operation of protecting a target field in a downlink protocol data unit by using the air interface protection key.

With reference to the first aspect or the first possible implementation of the first aspect or the second possible implementation of the first aspect or the third possible implementation of the first aspect or the fourth possible implementation of the first aspect or the fifth possible implementation of the first aspect or the sixth possible implementation of the first aspect, in a seventh possible implementation of the first aspect, the air interface protection key includes at least one of an encryption key or an integrity protection key.

With reference to the first aspect or the first possible implementation of the first aspect or the second possible implementation of the first aspect or the third possible implementation of the first aspect or the fourth possible implementation of the first aspect or the fifth possible implementation of the first aspect or the sixth possible implementation of the first aspect or the seventh possible implementation of the first aspect, in an eighth possible implementation of the first aspect, the target field includes at least one of an outer IP header outer IP header field, an encapsulation header encapsulation header field, and a protocol data unit header PDU header field.

With reference to the first aspect or the first possible implementation of the first aspect or the second possible implementation of the first aspect or the third possible implementation of the first aspect or the fourth possible implementation of the first aspect or the fifth possible implementation of the first aspect or the sixth possible implementation of the first aspect or the seventh possible implementation of the first aspect or the eighth possible implementation of the first aspect, in a ninth possible implementation of the first aspect, the information used to identify the session between the UE and the target node includes at least one of a bearer identifier, a flow identifier, a Media Access Control identifier of hardware, a session identifier, an Internet Protocol address of the UE, an IP address of the access network device, an access network identifier of an access network to which the access network device is connected, an IP address of the UE, a quality of service identifier, an international mobile subscriber identity, an international mobile equipment identity, an Internet Protocol multimedia private identity, an IP multimedia public identity, a temporary mobile subscriber identity, a mobile phone number of the UE, and a globally unique temporary user equipment identity of the UE.

With reference to the first aspect or the first possible implementation of the first aspect or the second possible implementation of the first aspect or the third possible implementation of the first aspect or the fourth possible implementation of the first aspect or the fifth possible implementation of the first aspect or the sixth possible implementation of the first aspect or the seventh possible implementation of the first aspect or the eighth possible implementation of the first aspect or the ninth possible implementation of the first aspect, in a tenth possible implementation of the first aspect, the target node includes a user plane-gateway in the core network, or a service server in the core network, or a server that is on the Internet and that has established a communications connection to a network element in the core network.

According to a second aspect, an embodiment of the present invention provides a communications system. The system includes user equipment UE and an access network device AN. The AN is configured to generate a target identifier corresponding to a target session, where the target session is a session between the UE and a target node, and data of the target session needs to pass through the AN during transmission; the AN is configured to send correspondence information to the UE, where the correspondence information indicates a correspondence between the target session and the target identifier; the UE is configured to: receive the correspondence information, and determine, based on the correspondence information, that the target session corresponds to the target identifier; the UE is configured to: encapsulate the target identifier in an uplink protocol data unit PDU of the target session, and send the uplink protocol data unit with the encapsulated target identifier to the AN; the AN is configured to receive the uplink protocol data unit; and the AN is configured to: replace the target identifier in the uplink protocol data unit with a reference identifier, and send the uplink protocol data unit obtained after the replacement to the target node, where the reference identifier is used for the target node to determine that the uplink protocol data unit belongs to the target session.

By running the system, a session protection mechanism is set in an air interface transmission stage between the UE and the AN. To be specific, after a target session is established between the UE and an UP-GW, the AN and the UE agree on a target identifier used to identify the target session. During transmission of a subsequent packet in an air interface stage, the target identifier is used in the packet to indicate that the packet is from the target session. The target identifier is replaced with a reference identifier (a device other than the AN and the UE can also determine the target session by using the reference identifier) during communication with a core network. In this way, the device other than the AN and the UE cannot deduce that the packet belongs to the target session even if the device has intercepted the target identifier, so that the session is prevented from being attacked.

With reference to the second aspect, in a first possible implementation of the second aspect, the AN is configured to receive a downlink protocol data unit sent by the target node, where the downlink protocol data unit includes the reference identifier to indicate that the downlink protocol data unit belongs to the target session; the AN is configured to: replace the reference identifier in the downlink protocol data unit with the target identifier, and send the downlink protocol data unit obtained after the replacement to the UE; and the UE is configured to: receive the downlink protocol data unit, and determine, based on the target identifier, that the downlink protocol data unit belongs to the target session.

With reference to the second aspect or the first possible implementation of the second aspect, in a second possible implementation of the second aspect, the reference identifier is encapsulated in at least one of an outer IP header outer IP header field, an encapsulation header encapsulation header field, and a protocol data unit header PDU header field.

With reference to the second aspect or the first possible implementation of the second aspect or the second possible implementation of the second aspect, in a third possible implementation of the second aspect, the reference identifier includes at least one of a bearer identifier, a flow identifier, a Media Access Control identifier of hardware, a session identifier, an Internet Protocol address of the UE, an IP address of the access network device, an access network identifier of an access network to which the access network device is connected, an IP address of the UE, a quality of service identifier, an international mobile subscriber identity, an international mobile equipment identity, an Internet Protocol multimedia private identity, an IP multimedia public identity, a temporary mobile subscriber identity, a mobile phone number of the UE, and a globally unique temporary user equipment identity of the UE.

With reference to the second aspect or the first possible implementation of the second aspect or the second possible implementation of the second aspect or the third possible implementation of the second aspect, in a fourth possible implementation of the second aspect, the target node includes a user plane-gateway in the core network, or a service server in the core network, or a server that is on the Internet and that has established a communications connection to a network element in the core network.

According to a third aspect, an embodiment of the present invention provides user equipment UE. The user equipment includes: a generation unit, configured to process a base key according to a preset rule to generate an air interface protection key, where the base key is a key generated from two-way authentication between the UE and a core network or a key derived from the key generated from the two-way authentication, and a key management device in the core network is configured to send the base key to an access network device AN, so that the AN processes the base key according to the preset rule to generate the air interface protection key; a protection unit, configured to protect a target field in an uplink protocol data unit PDU by using the air interface protection key, where the target field includes information used to identify a session between the UE and a target node, and data of the session between the target node and the UE needs to pass through the AN during transmission; and a sending unit, configured to send the uplink protocol data unit with the protected target field to the AN, so that the AN parses the target field in the uplink protocol data unit by using the air interface protection key.

By running the foregoing units, the UE and the AN negotiate the air interface protection key in advance, and then use the air interface protection key to protect a field that is included in a protocol data unit and that includes information used to identify a session between the UE and a user plane-gateway in the core network, so that an attacker cannot easily obtain the information used to identify the session between the UE and the user plane-gateway in the core network in an air interface stage, and the attacker cannot determine the session based on the information, thereby preventing the session from being attacked.

With reference to the third aspect, in a first possible implementation of the third aspect, the user equipment further includes: a first receiving unit, configured to: receive, by the UE, a downlink protocol data unit sent by the AN, and parse a target field in the downlink protocol data unit by using the air interface protection key, where the target field in the downlink protocol data unit has been encrypted by using the air interface protection key.

With reference to the first possible implementation of the third aspect, in a second possible implementation of the third aspect, that the first receiving unit parses the target field in the downlink protocol data unit by using the air interface protection key is In some embodiments: parsing the target field in the downlink protocol data unit by using the air interface protection key according to a rule defined in an air interface policy obtained in advance, where the target field in the downlink protocol data unit has been protected by the AN by using the air interface protection key according to the rule defined in the air interface policy obtained in advance, and a use rule of a key is defined in the air interface policy.

With reference to the third aspect or the first possible implementation of the third aspect or the second possible implementation of the third aspect, in a third possible implementation of the third aspect, the protection unit is In some embodiments configured to protect the target field in the uplink protocol data unit by using the air interface protection key according to a rule defined in an air interface policy obtained in advance, where the AN is configured to parse the target field by using the air interface protection key according to the rule defined in the air interface policy obtained in advance, and a use rule of a key is defined in the air interface policy.

With reference to the second possible implementation of the third aspect or the third possible implementation of the third aspect, in a fourth possible implementation of the third aspect, the user equipment further includes: a second receiving unit, configured to receive the air interface policy sent by the AN, where the air interface policy is generated by the AN according to an initial security policy, a generation rule of a key used in a target session is defined in the initial security policy, and the target session is a session between the target node and the UE.

With reference to the third aspect or the first possible implementation of the third aspect or the second possible implementation of the third aspect or the third possible implementation of the third aspect or the fourth possible implementation of the third aspect, in a fifth possible implementation of the third aspect, the UE further includes: a determining unit, configured to: determine whether a protocol data unit payload PDU payload field in the uplink protocol data unit is protected; and if the protocol data unit payload PDU payload field in the uplink protocol data unit is not protected, trigger the protection unit to protect the uplink protocol data unit by using the air interface protection key; or if the protocol data unit payload PDU payload field in the uplink protocol data unit is protected, trigger the protection unit to perform the operation of protecting a target field in an uplink protocol data unit PDU by the UE by using the air interface protection key.

With reference to the third aspect or the first possible implementation of the third aspect or the second possible implementation of the third aspect or the third possible implementation of the third aspect or the fourth possible implementation of the third aspect or the fifth possible implementation of the third aspect, in a sixth possible implementation of the third aspect, the air interface protection key includes at least one of an encryption key or an integrity protection key.

With reference to the third aspect or the first possible implementation of the third aspect or the second possible implementation of the third aspect or the third possible implementation of the third aspect or the fourth possible implementation of the third aspect or the fifth possible implementation of the third aspect or the sixth possible implementation of the third aspect, in a seventh possible implementation of the third aspect, the target field includes at least one of an outer IP header outer IP header field, an encapsulation header encapsulation header field, and a protocol data unit header PDU header field.

With reference to the third aspect or the first possible implementation of the third aspect or the second possible implementation of the third aspect or the third possible implementation of the third aspect or the fourth possible implementation of the third aspect or the fifth possible implementation of the third aspect or the sixth possible implementation of the third aspect or the seventh possible implementation of the third aspect, in an eighth possible implementation of the third aspect, the information used to identify the session between the UE and the target node includes at least one of a bearer identifier, a flow identifier, a Media Access Control identifier of hardware, a session identifier, an Internet Protocol address of the UE, an IP address of the access network device, an access network identifier of an access network to which the access network device is connected, an IP address of the UE, a quality of service identifier, an international mobile subscriber identity, an international mobile equipment identity, an Internet Protocol multimedia private identity, an IP multimedia public identity, a temporary mobile subscriber identity, a mobile phone number of the UE, and a globally unique temporary user equipment identity of the UE.

With reference to the third aspect or the first possible implementation of the third aspect or the second possible implementation of the third aspect or the third possible implementation of the third aspect or the fourth possible implementation of the third aspect or the fifth possible implementation of the third aspect or the sixth possible implementation of the third aspect or the seventh possible implementation of the third aspect or the eighth possible implementation of the third aspect, in a ninth possible implementation of the third aspect, the target node includes a user plane-gateway in the core network, or a service server in the core network, or a server that is on the Internet and that has established a communications connection to a network element in the core network.

According to a fourth aspect, an embodiment of the present invention provides an access network device AN. The access network device includes: a first receiving unit, configured to receive a base key sent by a key management device in a core network, where the base key is a key generated from two-way authentication between user equipment UE and the core network or a key derived from the key generated from the two-way authentication, and the UE is configured to process the base key according to a preset rule to generate an air interface protection key; a generation unit, configured to process the base key according to the preset rule to generate the air interface protection key; and a second receiving unit, configured to: receive an uplink protocol data unit sent by the UE, and parse a target field in the uplink protocol data unit by using the air interface protection key, where the target field in the uplink protocol data unit has been protected by the UE by using the air interface protection key, the target field includes information used to identify a session between the UE and a target node, and data of the session between the target node and the UE needs to pass through the AN during transmission.

By running the foregoing units, the UE and the AN negotiate the air interface protection key in advance, and then use the air interface protection key to protect a field that is included in a protocol data unit and that includes information used to identify a session between the UE and a user plane-gateway in the core network, so that an attacker cannot easily obtain the information used to identify the session between the UE and the user plane-gateway in the core network in an air interface stage, and the attacker cannot determine the session based on the information, thereby preventing the session from being attacked.

With reference to the fourth aspect, in a first possible implementation of the fourth aspect, the AN further includes: a protection unit, configured to: protect a target field in a downlink protocol data unit by using the air interface protection key, and send the downlink protocol data unit with the protected target field to the UE, so that the UE parses the target field in the downlink protocol data unit by using the air interface protection key.

With reference to the first possible implementation of the fourth aspect, in a second possible implementation of the fourth aspect, the AN further includes: a determining unit, configured to: determine whether a protocol data unit payload PDU payload field in the downlink protocol data unit is protected; and if the protocol data unit payload PDU payload field in the downlink protocol data unit is not protected, trigger the protection unit to protect the downlink protocol data unit by using the air interface protection key; or if the protocol data unit payload PDU payload field in the downlink protocol data unit is protected, trigger the protection unit to perform the operation of protecting a target field in a downlink protocol data unit by using the air interface protection key.

With reference to the first possible implementation of the fourth aspect or the second possible implementation of the fourth aspect, in a third possible implementation of the fourth aspect, that the protection unit protects the target field in the downlink protocol data unit using the air interface protection key is In some embodiments: protecting the target field in the downlink protocol data unit by using the air interface protection key according to a rule defined in an air interface policy obtained in advance, where the UE is configured to parse the target field in the downlink protocol data unit by using the air interface protection key according to the rule defined in the air interface policy obtained in advance, and a use rule of a key is defined in the air interface policy.

With reference to the fourth aspect or the first possible implementation of the fourth aspect or the second possible implementation of the fourth aspect or the third possible implementation of the fourth aspect, in a fourth possible implementation of the fourth aspect, that the second receiving unit parses the target field in the uplink protocol data unit by using the air interface protection key is In some embodiments: parsing the target field in the uplink protocol data unit by using the air interface protection key according to a rule defined in an air interface policy obtained in advance, where the target field in the uplink protocol data unit has been protected by the UE by using the air interface protection key according to the rule defined in the air interface policy obtained in advance, and a use rule of a key is defined in the air interface policy.

With reference to the third possible implementation of the fourth aspect or the fourth possible implementation of the fourth aspect, in a fifth possible implementation of the fourth aspect, the AN further includes: a third receiving unit, configured to receive an initial security policy from the core network, where a generation rule of a key used in a target session is defined in the initial security policy, and the target session is a session between the target node and the UE; and a sending unit, configured to: generate the air interface policy according to the initial security policy, and send the air interface policy to the UE.

With reference to the fourth aspect or the first possible implementation of the fourth aspect or the second possible implementation of the fourth aspect or the third possible implementation of the fourth aspect or the fourth possible implementation of the fourth aspect or the fifth possible implementation of the fourth aspect, in a sixth possible implementation of the fourth aspect, the air interface protection key includes at least one of an encryption key or an integrity protection key.

With reference to the fourth aspect or the first possible implementation of the fourth aspect or the second possible implementation of the fourth aspect or the third possible implementation of the fourth aspect or the fourth possible implementation of the fourth aspect or the fifth possible implementation of the fourth aspect or the sixth possible implementation of the fourth aspect, in a seventh possible implementation of the fourth aspect, the target field includes at least one of an outer IP header outer IP header field, an encapsulation header encapsulation header field, and a protocol data unit header PDU header field.

With reference to the fourth aspect or the first possible implementation of the fourth aspect or the second possible implementation of the fourth aspect or the third possible implementation of the fourth aspect or the fourth possible implementation of the fourth aspect or the fifth possible implementation of the fourth aspect or the sixth possible implementation of the fourth aspect or the seventh possible implementation of the fourth aspect, in an eighth possible implementation of the fourth aspect, the information used to identify the session between the UE and the target node includes at least one of a bearer identifier, a flow identifier, a Media Access Control identifier of hardware, a session identifier, an Internet Protocol address of the UE, an IP address of the access network device, an access network identifier of an access network to which the access network device is connected, an IP address of the UE, a quality of service identifier, an international mobile subscriber identity, an international mobile equipment identity, an Internet Protocol multimedia private identity, an IP multimedia public identity, a temporary mobile subscriber identity, a mobile phone number of the UE, and a globally unique temporary user equipment identity of the UE.

With reference to the fourth aspect or the first possible implementation of the fourth aspect or the second possible implementation of the fourth aspect or the third possible implementation of the fourth aspect or the fourth possible implementation of the fourth aspect or the fifth possible implementation of the fourth aspect or the sixth possible implementation of the fourth aspect or the seventh possible implementation of the fourth aspect or the eighth possible implementation of the fourth aspect, in a ninth possible implementation of the fourth aspect, the target node includes a user plane-gateway in the core network, or a service server in the core network, or a server that is on the Internet and that has established a communications connection to a network element in the core network.

According to a fifth aspect, an embodiment of the present invention provides user equipment UE. The UE includes: a first receiving unit, configured to: receive correspondence information sent by an access network device AN, and determine, based on the correspondence information, that a target session corresponds to a target identifier, where the target identifier is generated by the AN, the target session is a session between the UE and a target node, and data of the target session needs to pass through the AN during transmission; an encapsulation unit, configured to: encapsulate the target identifier in an uplink protocol data unit PDU of the target session, and send the uplink protocol data unit with the encapsulated target identifier to the AN, where the AN is configured to: replace the target identifier in the uplink protocol data unit with a reference identifier, and send the uplink protocol data unit obtained after the replacement to the target node, and the reference identifier is used for the target node to determine that the uplink protocol data unit belongs to the target session.

By running the foregoing units, a session protection mechanism is set in an air interface transmission stage between the UE and the AN. To be specific, after a target session is established between the UE and an UP-GW, the AN and the UE agree on a target identifier used to identify the target session. During transmission of a subsequent packet in an air interface stage, the target identifier is used in the packet to indicate that the packet is from the target session. The target identifier is replaced with a reference identifier (a device other than the AN and the UE can also determine the target session by using the reference identifier) during communication with a core network. In this way, the device other than the AN and the UE cannot deduce that the packet belongs to the target session even if the device has intercepted the target identifier, so that the session is prevented from being attacked.

With reference to the fifth aspect, in a first possible implementation of the fifth aspect, the UE further includes: a second receiving unit, configured to: receive a downlink protocol data unit sent by the AN, and determine, based on the target identifier, that the downlink protocol data unit belongs to the target session, where the AN is configured to: when the downlink protocol data unit sent by the target node is received, replace the reference identifier in the downlink protocol data unit with the target identifier, and send the downlink protocol data unit obtained after the replacement to the UE, and the downlink protocol data unit sent by the target node includes the reference identifier to indicate that the downlink protocol data unit belongs to the target session.

With reference to the fifth aspect or the first possible implementation of the fifth aspect, in a second possible implementation of the fifth aspect, the reference identifier is encapsulated in at least one of an outer IP header outer IP header field, an encapsulation header encapsulation header field, and a protocol data unit header PDU header field.

With reference to the fifth aspect or the first possible implementation of the fifth aspect or the second possible implementation of the fifth aspect, in a third possible implementation of the fifth aspect, the reference identifier includes at least one of a bearer identifier, a flow identifier, a Media Access Control identifier of hardware, a session identifier, an Internet Protocol address of the UE, an IP address of the access network device, an access network identifier of an access network to which the access network device is connected, an IP address of the UE, a quality of service identifier, an international mobile subscriber identity, an international mobile equipment identity, an Internet Protocol multimedia private identity, an IP multimedia public identity, a temporary mobile subscriber identity, a mobile phone number of the UE, and a globally unique temporary user equipment identity of the UE.

With reference to the fifth aspect or the first possible implementation of the fifth aspect or the second possible implementation of the fifth aspect or the third possible implementation of the fifth aspect, in a fourth possible implementation of the fifth aspect, the target node includes a user plane-gateway in the core network, or a service server in the core network, or a server that is on the Internet and that has established a communications connection to a network element in the core network.

According to a sixth aspect, an embodiment of the present invention provides an access network device AN. The AN includes: a generation unit, configured to generate a target identifier corresponding to a target session, where the target session is a session between user equipment UE and a target node, and data of the target session needs to pass through the AN during transmission; a first sending unit, configured to send correspondence information to the UE, so that the UE encapsulates the target identifier in an uplink protocol data unit PDU of the target session, where the correspondence information indicates a correspondence between the target session and the target identifier; a first receiving unit, configured to receive the uplink protocol data unit with the encapsulated target identifier that is sent by the UE; a replacement unit, configured to: replace the target identifier in the uplink protocol data unit with a reference identifier, and send the uplink protocol data unit obtained after the replacement to the target node, where the reference identifier is used for the target node to determine that the uplink protocol data unit belongs to the target session.

By running the foregoing units, a session protection mechanism is set in an air interface transmission stage between the UE and the AN. To be specific, after a target session is established between the UE and an UP-GW, the AN and the UE agree on a target identifier used to identify the target session. During transmission of a subsequent packet in an air interface stage, the target identifier is used in the packet to indicate that the packet is from the target session. The target identifier is replaced with a reference identifier (a device other than the AN and the UE can also determine the target session by using the reference identifier) during communication with a core network. In this way, the device other than the AN and the UE cannot deduce that the packet belongs to the target session even if the device has intercepted the target identifier, so that the session is prevented from being attacked.

With reference to the sixth aspect, in a first possible implementation of the sixth aspect, the AN further includes: a second receiving unit, configured to receive a downlink protocol data unit sent by the target node, where the downlink protocol data unit includes the reference identifier to indicate that the downlink protocol data unit belongs to the target session; and a second sending unit, configured to: replace the reference identifier in the downlink protocol data unit with the target identifier, and send the downlink protocol data unit obtained after the replacement to the UE, so that the UE determines, based on the target identifier, that the downlink protocol data unit belongs to the target session.

With reference to the sixth aspect or the first possible implementation of the sixth aspect, in a second possible implementation of the sixth aspect, the reference identifier is encapsulated in at least one of an outer IP header outer IP header field, an encapsulation header encapsulation header field, and a protocol data unit header PDU header field.

With reference to the sixth aspect or the first possible implementation of the sixth aspect or the second possible implementation of the sixth aspect, in a third possible implementation of the sixth aspect, the reference identifier includes at least one of a bearer identifier, a flow identifier, a Media Access Control identifier of hardware, a session identifier, an Internet Protocol address of the UE, an IP address of the access network device, an access network identifier of an access network to which the access network device is connected, an IP address of the UE, a quality of service identifier, an international mobile subscriber identity, an international mobile equipment identity, an Internet Protocol multimedia private identity, an IP multimedia public identity, a temporary mobile subscriber identity, a mobile phone number of the UE, and a globally unique temporary user equipment identity of the UE.

With reference to the sixth aspect or the first possible implementation of the sixth aspect or the second possible implementation of the sixth aspect or the third possible implementation of the sixth aspect, in the fourth possible implementation of the sixth aspect, the target node includes a user plane-gateway in the core network, or a service server in the core network, or a server that is on the Internet and that has established a communications connection to a network element in the core network.

According to a seventh aspect, an embodiment of the present invention provides a data transmission method. The method includes: processing, by user equipment UE, a base key according to a preset rule to generate an air interface protection key, where the base key is a key generated from two-way authentication between the UE and a core network or a key derived from the key generated from the two-way authentication, and a key management device in the core network is configured to send the base key to an access network device AN, so that the AN processes the base key according to the preset rule to generate the air interface protection key; protecting, by the UE, a target field in an uplink protocol data unit PDU by using the air interface protection key, where the target field includes information used to identify a session between the UE and a target node, and data of the session between the target node and the UE needs to pass through the AN during transmission; and sending, by the UE, the uplink protocol data unit with the protected target field to the AN, so that the AN parses the target field in the uplink protocol data unit by using the air interface protection key.

By performing the foregoing steps, the UE and the AN negotiate the air interface protection key in advance, and then use the air interface protection key to protect a field that is included in a protocol data unit and that includes information used to identify a session between the UE and a user plane-gateway in the core network, so that an attacker cannot easily obtain the information used to identify the session between the UE and the user plane-gateway in the core network in an air interface stage, and the attacker cannot determine the session based on the information, thereby preventing the session from being attacked.

With reference to the seventh aspect, in a first possible implementation of the seventh aspect, after the processing, by user equipment UE, a base key according to a preset rule to generate an air interface protection key, the method further includes: receiving, by the UE, a downlink protocol data unit sent by the AN, and parsing a target field in the downlink protocol data unit by using the air interface protection key, where the target field in the downlink protocol data unit has been encrypted by using the air interface protection key.

With reference to the first possible implementation of the seventh aspect, in a second possible implementation of the seventh aspect, the parsing a target field in the downlink protocol data unit by using the air interface protection key includes: parsing the target field in the downlink protocol data unit by using the air interface protection key according to a rule defined in an air interface policy obtained in advance, where the target field in the downlink protocol data unit has been protected by the AN by using the air interface protection key according to the rule defined in the air interface policy obtained in advance, and a use rule of a key is defined in the air interface policy.

With reference to the seventh aspect or the first possible implementation of the seventh aspect or the second possible implementation of the seventh aspect, in a third possible implementation of the seventh aspect, the protecting, by the UE, a target field in an uplink protocol data unit PDU by using the air interface protection key includes: protecting the target field in the uplink protocol data unit by using the air interface protection key according to a rule defined in an air interface policy obtained in advance, where the AN is configured to parse the target field by using the air interface protection key according to the rule defined in the air interface policy obtained in advance, and a use rule of a key is defined in the air interface policy.

With reference to the second possible implementation of the seventh aspect or the third possible implementation of the seventh aspect, in a fourth possible implementation of the seventh aspect, the method further includes: receiving, by the UE, the air interface policy sent by the AN, where the air interface policy is generated by the AN according to an initial security policy, a generation rule of a key used in a target session is defined in the initial security policy, and the target session is a session between the target node and the UE.

With reference to the seventh aspect or the first possible implementation of the seventh aspect or the second possible implementation of the seventh aspect or the third possible implementation of the seventh aspect or the fourth possible implementation of the seventh aspect, in a fifth possible implementation of the seventh aspect, before the protecting, by the UE, a target field in an uplink protocol data unit PDU by using the air interface protection key, the method further includes: determining, by the UE, whether a protocol data unit payload PDU payload field in the uplink protocol data unit is protected; and if the protocol data unit payload PDU payload field in the uplink protocol data unit is not protected, protecting, by the UE, the uplink protocol data unit by using the air interface protection key; or if the protocol data unit payload PDU payload field in the uplink protocol data unit is protected, performing, by the UE, the operation of protecting a target field in an uplink protocol data unit PDU by using the air interface protection key by the UE.

With reference to the seventh aspect or the first possible implementation of the seventh aspect or the second possible implementation of the seventh aspect or the third possible implementation of the seventh aspect or the fourth possible implementation of the seventh aspect or the fifth possible implementation of the seventh aspect, in a sixth possible implementation of the seventh aspect, the air interface protection key includes at least one of an encryption key or an integrity protection key.

With reference to the seventh aspect or the first possible implementation of the seventh aspect or the second possible implementation of the seventh aspect or the third possible implementation of the seventh aspect or the fourth possible implementation of the seventh aspect or the fifth possible implementation of the seventh aspect or the sixth possible implementation of the seventh aspect, in a seventh possible implementation of the seventh aspect, the target field includes at least one of an outer IP header outer IP header field, an encapsulation header encapsulation header field, and a protocol data unit header PDU header field.

With reference to the seventh aspect or the first possible implementation of the seventh aspect or the second possible implementation of the seventh aspect or the third possible implementation of the seventh aspect or the fourth possible implementation of the seventh aspect or the fifth possible implementation of the seventh aspect or the sixth possible implementation of the seventh aspect or the seventh possible implementation of the seventh aspect, in an eighth possible implementation of the seventh aspect, the information used to identify the session between the UE and the target node includes at least one of a bearer identifier, a flow identifier, a Media Access Control identifier of hardware, a session identifier, an Internet Protocol address of the UE, an IP address of the access network device, an access network identifier of an access network to which the access network device is connected, an IP address of the UE, a quality of service identifier, an international mobile subscriber identity, an international mobile equipment identity, an Internet Protocol multimedia private identity, an IP multimedia public identity, a temporary mobile subscriber identity, a mobile phone number of the UE, and a globally unique temporary user equipment identity of the UE.

With reference to the seventh aspect or the first possible implementation of the seventh aspect or the second possible implementation of the seventh aspect or the third possible implementation of the seventh aspect or the fourth possible implementation of the seventh aspect or the fifth possible implementation of the seventh aspect or the sixth possible implementation of the seventh aspect or the seventh possible implementation of the seventh aspect or the eighth possible implementation of the seventh aspect, in a ninth possible implementation of the seventh aspect, the target node includes a user plane-gateway in the core network, or a service server in the core network, or a server that is on the Internet and that has established a communications connection to a network element in the core network.

According to an eighth aspect, an embodiment of the present invention provides a data transmission method. The method includes: receiving, by an access network device AN, a base key sent by a key management device in a core network, where the base key is a key generated from two-way authentication between user equipment UE and the core network or a key derived from the key generated from the two-way authentication, and the UE is configured to process the base key according to a preset rule to generate an air interface protection key; processing, by the AN, the base key according to the preset rule to generate the air interface protection key; and receiving, by the AN, an uplink protocol data unit sent by the UE, and parsing a target field in the uplink protocol data unit by using the air interface protection key, where the target field in the uplink protocol data unit has been protected by the UE by using the air interface protection key, the target field includes information used to identify a session between the UE and a target node, and data of the session between the target node and the UE needs to pass through the AN during transmission.

By performing the foregoing steps, the UE and the AN negotiate the air interface protection key in advance, and then use the air interface protection key to protect a field that is included in a protocol data unit and that includes information used to identify a session between the UE and a user plane-gateway in the core network, so that an attacker cannot easily obtain the information used to identify the session between the UE and the user plane-gateway in the core network in an air interface stage, and the attacker cannot determine the session based on the information, thereby preventing the session from being attacked.

With reference to the eighth aspect, in a first possible implementation of the eighth aspect, after the processing, by the AN, the base key according to the preset rule to generate the air interface protection key, the method further includes: protecting, by the AN, a target field in a downlink protocol data unit by using the air interface protection key, and sending the downlink protocol data unit with the protected target field to the UE, so that the UE parses the target field in the downlink protocol data unit by using the air interface protection key.

With reference to the first possible implementation of the eighth aspect, in a second possible implementation of the eighth aspect, before the protecting, by the AN, a target field in a downlink protocol data unit by using the air interface protection key, the method further includes: determining, by the AN, whether a protocol data unit payload PDU payload field in the downlink protocol data unit is protected; and if the protocol data unit payload PDU payload field in the downlink protocol data unit is not protected, protecting, by the AN, the downlink protocol data unit by using the air interface protection key; or if the protocol data unit payload PDU payload field in the downlink protocol data unit is protected, performing, by the AN, the step of protecting a target field in a downlink protocol data unit by using the air interface protection key.

With reference to the first possible implementation of the eighth aspect or the second possible implementation of the eighth aspect, in a third possible implementation of the eighth aspect, the protecting, by the AN, a target field in a downlink protocol data unit by using the air interface protection key includes: protecting the target field in the downlink protocol data unit by using the air interface protection key according to a rule defined in an air interface policy obtained in advance, where the UE is configured to parse the target field in the downlink protocol data unit by using the air interface protection key according to the rule defined in the air interface policy obtained in advance, and a use rule of a key is defined in the air interface policy.

With reference to the eighth aspect or the first possible implementation of the eighth aspect or the second possible implementation of the eighth aspect or the third possible implementation of the eighth aspect, in a fourth possible implementation of the eighth aspect, the parsing a target field in the uplink protocol data unit by using the air interface protection key includes: parsing the target field in the uplink protocol data unit by using the air interface protection key according to a rule defined in an air interface policy obtained in advance, where the target field in the uplink protocol data unit has been protected by the UE by using the air interface protection key according to the rule defined in the air interface policy obtained in advance, and a use rule of a key is defined in the air interface policy.

With reference to the third possible implementation of the eighth aspect or the fourth possible implementation of the eighth aspect, in a fifth possible implementation of the eighth aspect, the method further includes: receiving, by the AN, an initial security policy from the core network, where a generation rule of a key used in a target session is defined in the initial security policy, and the target session is a session between the target node and the UE; and generating, by the AN, the air interface policy according to the initial security policy, and sending the air interface policy to the UE.

With reference to the eighth aspect or the first possible implementation of the eighth aspect or the second possible implementation of the eighth aspect or the third possible implementation of the eighth aspect or the fourth possible implementation of the eighth aspect or the fifth possible implementation of the eighth aspect, in a sixth possible implementation of the eighth aspect, the air interface protection key includes at least one of an encryption key or an integrity protection key.

With reference to the eighth aspect or the first possible implementation of the eighth aspect or the second possible implementation of the eighth aspect or the third possible implementation of the eighth aspect or the fourth possible implementation of the eighth aspect or the fifth possible implementation of the eighth aspect or the sixth possible implementation of the eighth aspect, in a seventh possible implementation of the eighth aspect, the target field includes at least one of an outer IP header outer IP header field, an encapsulation header encapsulation header field, and a protocol data unit header PDU header field.

With reference to the eighth aspect or the first possible implementation of the eighth aspect or the second possible implementation of the eighth aspect or the third possible implementation of the eighth aspect or the fourth possible implementation of the eighth aspect or the fifth possible implementation of the eighth aspect or the sixth possible implementation of the eighth aspect or the seventh possible implementation of the eighth aspect, in an eighth possible implementation of the eighth aspect, the information used to identify the session between the UE and the target node includes at least one of a bearer identifier, a flow identifier, a Media Access Control identifier of hardware, a session identifier, an Internet Protocol address of the UE, an IP address of the access network device, an access network identifier of an access network to which the access network device is connected, an IP address of the UE, a quality of service identifier, an international mobile subscriber identity, an international mobile equipment identity, an Internet Protocol multimedia private identity, an IP multimedia public identity, a temporary mobile subscriber identity, a mobile phone number of the UE, and a globally unique temporary user equipment identity of the UE.

With reference to the eighth aspect or the first possible implementation of the eighth aspect or the second possible implementation of the eighth aspect or the third possible implementation of the eighth aspect or the fourth possible implementation of the eighth aspect or the fifth possible implementation of the eighth aspect or the sixth possible implementation of the eighth aspect or the seventh possible implementation of the eighth aspect or the eighth possible implementation of the eighth aspect, in a ninth possible implementation of the eighth aspect, the target node includes a user plane-gateway in the core network, or a service server in the core network, or a server that is on the Internet and that has established a communications connection to a network element in the core network.

According to a ninth aspect, an embodiment of the present invention provides a data transmission method. The method includes: receiving, by user equipment UE, correspondence information sent by an access network device AN, and determining, based on the correspondence information, that a target session corresponds to a target identifier, where the target identifier is generated by the AN, the target session is a session between the UE and a target node, and data of the target session needs to pass through the AN during transmission; encapsulating, by the UE, the target identifier in an uplink protocol data unit PDU of the target session, and sending the uplink protocol data unit with the encapsulated target identifier to the AN, where the AN is configured to: replace the target identifier in the uplink protocol data unit with a reference identifier, and send the uplink protocol data unit obtained after the replacement to the target node, and the reference identifier is used for the target node to determine that the uplink protocol data unit belongs to the target session.

By performing the foregoing steps, a session protection mechanism is set in an air interface transmission stage between the UE and the AN. To be specific, after a target session is established between the UE and an UP-GW, the AN and the UE agree on a target identifier used to identify the target session. During transmission of a subsequent packet in an air interface stage, the target identifier is used in the packet to indicate that the packet is from the target session. The target identifier is replaced with a reference identifier (a device other than the AN and the UE can also determine the target session by using the reference identifier) during communication with a core network. In this way, the device other than the AN and the UE cannot deduce that the packet belongs to the target session even if the device has intercepted the target identifier, so that the session is prevented from being attacked.

With reference to the ninth aspect, in a first possible implementation of the ninth aspect, after the receiving, by user equipment UE, correspondence information sent by an access network device AN, and determining, based on the correspondence information, that a target session corresponds to a target identifier, the method further includes: receiving, by the UE, a downlink protocol data unit sent by the AN, and determining, based on the target identifier, that the downlink protocol data unit belongs to the target session, where the AN is configured to: when the downlink protocol data unit sent by the target node is received, replace the reference identifier in the downlink protocol data unit with the target identifier, and send the downlink protocol data unit obtained after the replacement to the UE, and the downlink protocol data unit sent by the target node includes the reference identifier to indicate that the downlink protocol data unit belongs to the target session.

With reference to the ninth aspect or the first possible implementation of the ninth aspect, in a second possible implementation of the ninth aspect, the reference identifier is encapsulated in at least one of an outer IP header outer IP header field, an encapsulation header encapsulation header field, and a protocol data unit header PDU header field.

With reference to the ninth aspect or the first possible implementation of the ninth aspect or the second possible implementation of the ninth aspect, in a third possible implementation of the ninth aspect, the reference identifier includes at least one of a bearer identifier, a flow identifier, a Media Access Control identifier of hardware, a session identifier, an Internet Protocol address of the UE, an IP address of the access network device, an access network identifier of an access network to which the access network device is connected, an IP address of the UE, a quality of service identifier, an international mobile subscriber identity, an international mobile equipment identity, an Internet Protocol multimedia private identity, an IP multimedia public identity, a temporary mobile subscriber identity, a mobile phone number of the UE, and a globally unique temporary user equipment identity of the UE.

With reference to the ninth aspect or the first possible implementation of the ninth aspect or the second possible implementation of the ninth aspect or the third possible implementation of the ninth aspect, in a fourth possible implementation of the ninth aspect, the target node includes a user plane-gateway in the core network, or a service server in the core network, or a server that is on the Internet and that has established a communications connection to a network element in the core network.

According to a tenth aspect, an embodiment of the present invention provides a data transmission method. The method includes: generating, by an access network device AN, a target identifier corresponding to a target session, where the target session is a session between user equipment UE and a target node, and data of the target session needs to pass through the AN during transmission; sending, by the AN, correspondence information to the UE, so that the UE encapsulates the target identifier in an uplink protocol data unit PDU of the target session, where the correspondence information indicates a correspondence between the target session and the target identifier; receiving, by the AN, the uplink protocol data unit with the encapsulated target identifier that is sent by the UE; and replacing, by the AN, the target identifier in the uplink protocol data unit with a reference identifier, and sending the uplink protocol data unit obtained after the replacement to the target node, where the reference identifier is used for the target node to determine that the uplink protocol data unit belongs to the target session.

By performing the foregoing steps, a session protection mechanism is set in an air interface transmission stage between the UE and the AN. To be specific, after a target session is established between the UE and an UP-GW, the AN and the UE agree on a target identifier used to identify the target session. During transmission of a subsequent packet in an air interface stage, the target identifier is used in the packet to indicate that the packet is from the target session. The target identifier is replaced with a reference identifier (a device other than the AN and the UE can also determine the target session by using the reference identifier) during communication with a core network. In this way, the device other than the AN and the UE cannot deduce that the packet belongs to the target session even if the device has intercepted the target identifier, so that the session is prevented from being attacked.

With reference to the tenth aspect, in a first possible implementation of the tenth aspect, after the sending, by the AN, correspondence information to the UE, the method further includes: receiving, by the AN, a downlink protocol data unit sent by the target node, where the downlink protocol data unit includes the reference identifier to indicate that the downlink protocol data unit belongs to the target session; replacing, by the AN, the reference identifier in the downlink protocol data unit with the target identifier, and sending the downlink protocol data unit obtained after the replacement to the UE, so that the UE determines, based on the target identifier, that the downlink protocol data unit belongs to the target session.

With reference to the tenth aspect or the first possible implementation of the tenth aspect, in a second possible implementation of the tenth aspect, the reference identifier is encapsulated in at least one of an outer IP header outer IP header field, an encapsulation header encapsulation header field, and a protocol data unit header PDU header field.

With reference to the tenth aspect or the first possible implementation of the tenth aspect or the second possible implementation of the tenth aspect, in a third possible implementation of the tenth aspect, the reference identifier includes at least one of a bearer identifier, a flow identifier, a Media Access Control identifier of hardware, a session identifier, an Internet Protocol address of the UE, an IP address of the access network device, an access network identifier of an access network to which the access network device is connected, an IP address of the UE, a quality of service identifier, an international mobile subscriber identity, an international mobile equipment identity, an Internet Protocol multimedia private identity, an IP multimedia public identity, a temporary mobile subscriber identity, a mobile phone number of the UE, and a globally unique temporary user equipment identity of the UE.

With reference to the tenth aspect or the first possible implementation of the tenth aspect or the second possible implementation of the tenth aspect or the third possible implementation of the tenth aspect, in a fourth possible implementation of the tenth aspect, the target node includes a user plane-gateway in the core network, or a service server in the core network, or a server that is on the Internet and that has established a communications connection to a network element in the core network.

According to an eleventh aspect, an embodiment of the present invention provides user equipment. The user equipment includes a processor and a memory, the memory is configured to store a program and data, and the processor invokes the program in the memory to perform the data transmission method described in the seventh aspect or any possible implementation of the seventh aspect.

According to a twelfth aspect, an embodiment of the present invention provides an access network device. The access network device includes a processor and a memory, the memory is configured to store a program and data, and the processor invokes the program in the memory to perform the data transmission method described in the eighth aspect or any possible implementation of the eighth aspect.

According to a thirteenth aspect, an embodiment of the present invention provides user equipment. The user equipment includes a processor and a memory, the memory is configured to store a program and data, and the processor invokes the program in the memory to perform the data transmission method described in the ninth aspect or any possible implementation of the ninth aspect.

According to a fourteenth aspect, an embodiment of the present invention provides an access network device. The access network device includes a processor and a memory, the memory is configured to store a program and data, and the processor invokes the program in the memory to perform the data transmission method described in the tenth aspect or any possible implementation of the tenth aspect.

According to a fifteenth aspect, an embodiment of the present invention provides a storage medium. The storage medium is configured to store an instruction, and the method described in the seventh aspect or any possible implementation of the seventh aspect or the eighth aspect or any possible implementation of the eighth aspect or the ninth aspect or any possible implementation of the ninth aspect or the tenth aspect or any possible implementation of the tenth aspect is implemented when the instruction is executed on a processor.

By implementing the embodiments of the present invention, the UE and the AN negotiate the air interface protection key in advance, and then use the air interface protection key to protect a field that is included in a protocol data unit and that includes information used to identify a session between the UE and a user plane-gateway in the core network, so that an attacker cannot easily obtain the information used to identify the session between the UE and the user plane-gateway in the core network in an air interface stage, and the attacker cannot determine the session based on the information, thereby preventing the session from being attacked.

BRIEF DESCRIPTION OF DRAWINGS

The following briefly describes the accompanying drawings required for the background or embodiments.

DESCRIPTION OF EMBODIMENTS

The following describes the technical solutions in the embodiments of the present invention with reference to the accompanying drawings in the embodiments of the present invention.

An end-to-end protection mechanism usually includes end-to-end protection between UE and a device (for example, a user plane-gateway) in a core network, end-to-end protection between UE and an Internet server, and end-to-end protection between UE and another device in a network. If data is protected between a node and UE according to the end-to-end protection mechanism, the node may be referred to as a target node. To be specific, the target node may be a user plane-gateway in a core network, a service server (a service server or an application server) in a core network, a server (which is usually referred to as an Internet server, including, a gateway controller on the Internet) that is on the Internet and that has established a communications connection to a device in a core network, or the like. An end-to-end protection mechanism between UE and a user plane-gateway in a core network is mainly used as an example to describe the embodiments of the present invention. If the UE and the user plane-gateway are under end-to-end protection, the UE and the user plane-gateway negotiate a solution to protect transmitted service data (for example, in some scenarios, the service data is encapsulated in a protocol data unit payload (PDU payload)). A node between the UE and the user plane-gateway cannot learn of how the service data is protected between the UE and the user plane-gateway. However, some other information is transmitted along with the service data. It is usually inconvenient for the UE and the user plane-gateway to perform end-to-end protection on the information, for example, a protocol data unit header (PDU header). How to protect other unprotected information during end-to-end protection of service data is mainly described in the embodiments of the present invention.

Figure 1:
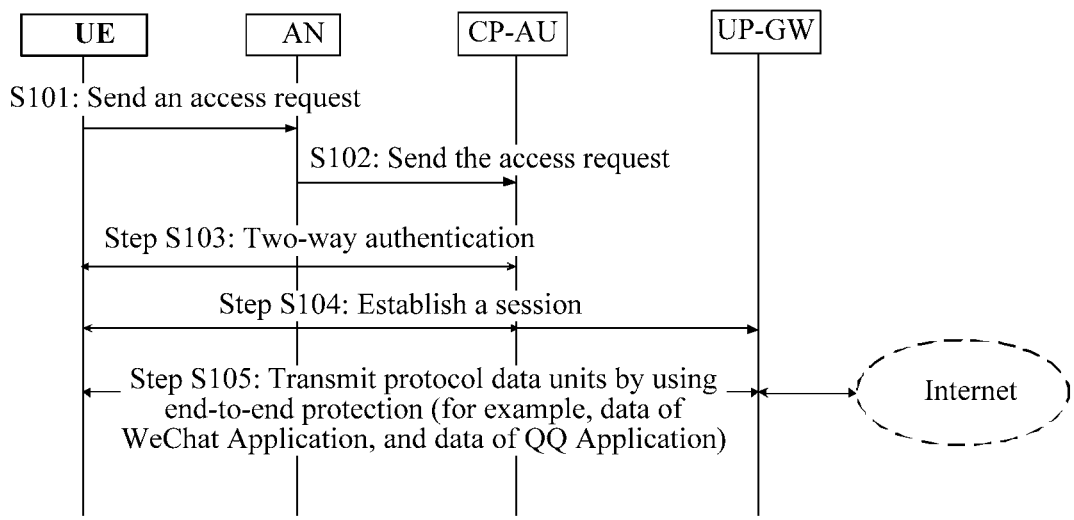
FIG. 1 is a flowchart of an end-to-end protection mechanism in the prior art.
Figure 2:
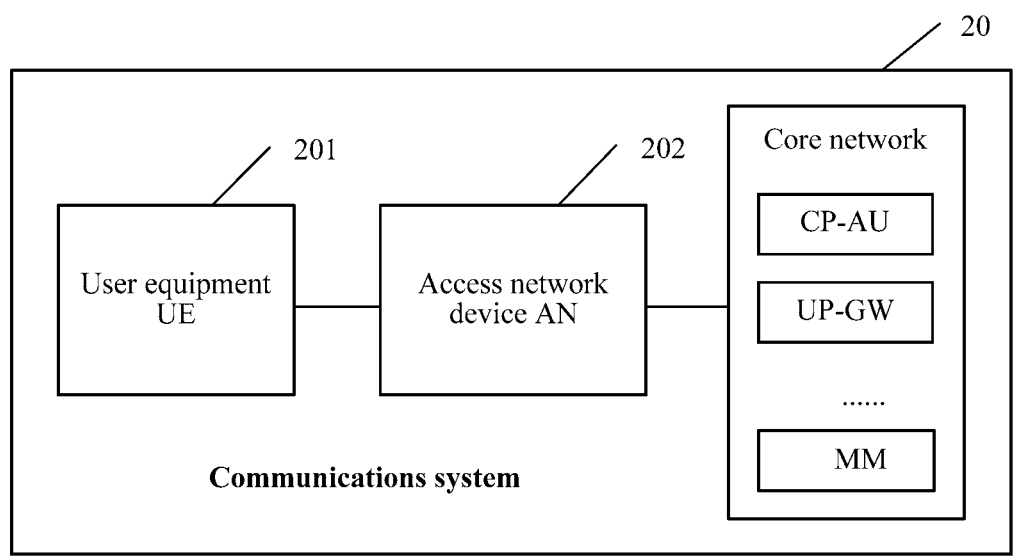
FIG. 2 is a schematic structural diagram of a communications system according to an embodiment of the present invention.

FIG. 2 is a schematic architectural diagram of a communications system 20 according to an embodiment of the present invention. The architectural diagram includes user equipment (UE) 201, an access network device (AN) 202, and devices in a core network (CN). During actual application, the communications system 20 may further include another device.

The UE may be a smart device such as a mobile phone and a smartwatch, or may be a communications device such as a server, a gateway, a base station, or a controller, or may be an Internet Of Things (IoT) device such as a sensor, an electricity meter, and a water meter, or may be another device that can be connected to a cellular network or a wired network.

The access network device 202 may be a device that wirelessly communicates with the user equipment 201, and is, for example, a node B (NB), an eNB, a wireless access point in Wireless Fidelity (Wi-Fi), or a wireless access network device in a future 5G network. Alternatively, the access network device 202 may be a device that communicates with the user equipment 201 in a wired manner, and is, for example, a gateway, a server, or a control gateway. A wired transmission manner includes but is not limited to an Internet Protocol (English: Internet Protocol, IP for short)-based network, a content-based network, and an identity-based network. An example in which UE is wirelessly connected to a network is used to describe the following embodiments. Wireless transmission between the UE and the AN is in an air interface stage. How to ensure secure transmission of data in the air interface stage is mainly described in the embodiments of the present invention.

Many devices (or referred to as "network element") may exist in the CN and are, for example, a mobility management (MM) network element, a session management (SM) network element, a key management system (KMS) network element, a control plane-authentication unit (CP-AU) network element, and a user plane-gateway (UP-GW). The MM network element may be referred to as a mobility management device or an MM. The SM network element may be referred to as a session management device or an SM, and is configured to establish and manage a session, a slice, a flow or a bearer. The KMS network element may be referred to as a key management device or a KMS, is responsible for generating, managing, and negotiating a key, and supports lawful interception. The KMS may be separately deployed as an independent logical functional entity, or may be integrated in a network element such as the MM network element, the SM network element, a mobility management entity (MME) network element, an authentication server function (AUSF) entity network element, a security anchor function (SEAFt) network element, a security context management function (SCMF) network element, a bootstrapping server function (English: Bootstrapping Server Function, BSF for short) network element, and a call session control function (English: Call Session Control Function, CSCF for short) entity network element. Generally, the KMS is an authentication unit (CP-AU) in a network. The UP-GW is configured to connect an operator network and a data network (DN). UE is connected to the Internet through the UP-GW.

Figure 3:
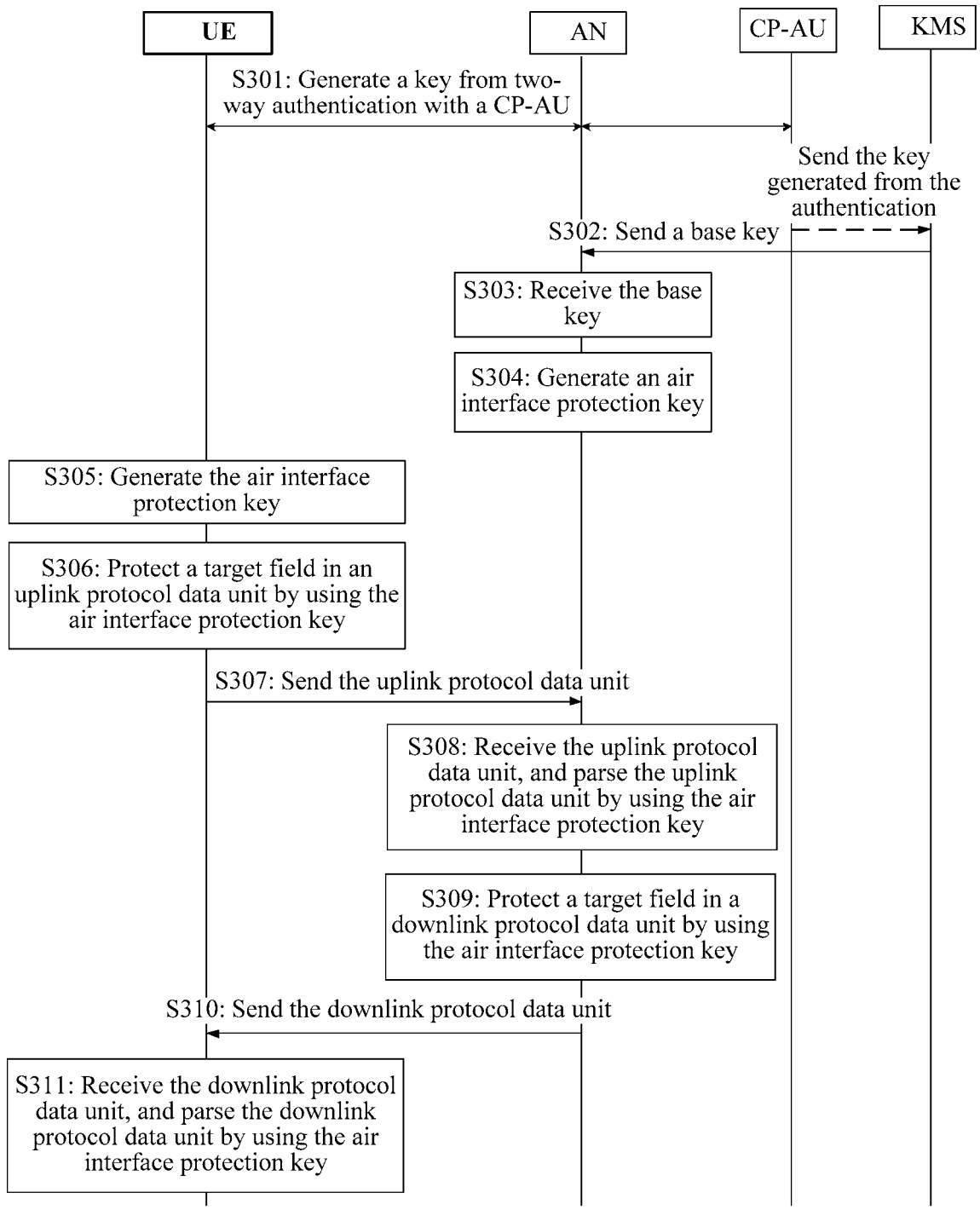
FIG. 3 is a flowchart of a data transmission method according to an embodiment of the present invention.

FIG. 3 is a flowchart of a data transmission method according to an embodiment of the present invention. The method may be implemented based on the communications system 20 shown in FIG. 2. A specific procedure includes but is not limited to the following steps.

Step S301: The UE and the key management device in the CN perform two-way authentication.

In some embodiments, the key management device in the CN is usually a CP-AU. In some embodiments, a function of the key management device may be integrated in another network element. A shared key is generated after the UE and the key management device are mutually authenticated.

Step S302: The key management device in the CN sends a base key to the AN.

In some embodiments, there may be two cases of the base key: In Case 1, the base key is a key generated from the two-way authentication between the UE and the key management device. In Case 2, the base key is obtained after derivation is performed one or more times on the key generated from the two-way authentication. A derivation rule may be defined in advance in a communication protocol. Both the UE and the key management device can derive the base key according to the rule defined in the communication protocol.

Step S303: The AN receives the base key.

Step S304: The AN processes the base key according to a preset rule to generate an air interface protection key.

In some embodiments, the preset rule is a key generation rule. In an solution, information such as a key algorithm, a key length, and a key update period may be defined in the preset rule. For example, common key algorithms include null, Snow 3G, ZUC, AES, and the like. Common key lengths include 64 bits, 128 bits, 256 bits, and the like. Common key update periods include six hours, 12 hours, one day, two days, and the like. The preset rule may be configured in a protocol in advance, or may be computed based on real-time information. In another solution, refer to a generation manner of a key used in air interface transmission in the fourth generation mobile communication (English: The 4th Generation mobile communication, 4G for short) technology for the preset rule. The AN determines an air interface encryption algorithm of the AN and an integrity protection algorithm based on a priority list of security algorithms of a base station and a list of security algorithms supported by the UE. The AN generates an air interface encryption protection key based on an identifier of the air interface encryption algorithm and the base key. The AN generates an air interface integrity protection key based on an identifier of the integrity protection algorithm and the base key. The air interface encryption protection key and the air interface integrity protection key are both air interface protection keys herein. The air interface encryption algorithm and the integrity protection algorithm may be negotiated in a plurality of manners. For example, the air interface encryption algorithm and the integrity protection algorithm are negotiated in a manner the same as an algorithm negotiation manner in 4G. Alternatively, a protection algorithm is determined according to a policy generated during establishment of a session. In another optional solution, the AN derives the air interface protection key from the base key, and other parameters such as a device identifier of the AN, a cell radio network temporary identifier (English: Cell Radio Network Temporary Identifier, C-RNTI for short), a sequence number (English: sequence number, SN for short), and an identification of the UE may be further used during the derivation.

Step S305: The UE processes the base key according to the preset rule to generate the air interface protection key.

In some embodiments, the UE generates the air interface protection key in a manner the same as that of the AN.

Step S306: The UE protects a target field in an uplink protocol data unit by using the air interface protection key.

In some embodiments, a symmetric key-based password technology is used to protect a protocol data unit in this embodiment of the present invention. A protection manner includes at least one of encryption protection and integrity protection. Two parties in communication are required to share in advance a shared key K for protection in the symmetric key-based password technology. Principles of encryption protection and integrity protection are described below by using an example in which the two parties in communication are a user 1 (user 1) and a user 2 (a user 2).

Encryption protection: The user 1 and the user 2 share the shared key K. The user 1 encrypts a message m by using the shared key K. This may be represented as ciphtext=En_K_(m). The user 1 then sends the encrypted message m to the user 2. The user 2 may recover m by using the shared key K and ciphertext. This may be represented as m=decrypt(K, ciphtext). Algorithms that can be chosen for encryption protection include Advanced Encryption Standard (AES), Triple Data Encryption Algorithm (TDEA, also referred to as 3DES), Blowfish, Serpent, Snow 3G, ZUC, HC-256, Grain, and the like.

Integrity protection: The user 1 and the user 2 share the shared key K. The user 1 computes a message authentication code (English: message Authentication code, MAC for short) of the message m by using the shared key K. This may be represented as MAC1=MAC_K_(m). To be specific, a message authentication code MAC1 corresponding to the message m is computed by using the shared key K. The user 1 then sends the message authentication code MAC1 and the message m to the user 2. The user 2 receives MAC1 and the message m, and then verifies correctness of MAC1 by using the shared key K and the message m. If the correctness of MAC1 is verified, it indicates that the message is not tampered. Algorithms used in integrity protection may include a hash operation message authentication code (HMAC) algorithm (for example, HMAC-sha256), a one-key message authentication code (OMAC), a cipher block chaining message authentication code (CBC-MAC), a parallelizable message authentication code (PMAC), a message authentication code based on universal hashing (UMAC), and the like. If the protection manner includes encryption protection, a subsequent parsing manner includes decryption. If the protection manner includes integrity protection, a subsequent parsing manner includes integrity verification.

A relationship between the UE and the AN in this embodiment of the present invention is equivalent to a relationship between the user 1 and the user 2, and the air interface protection key is equivalent to the "shared key K".

Figure 4:
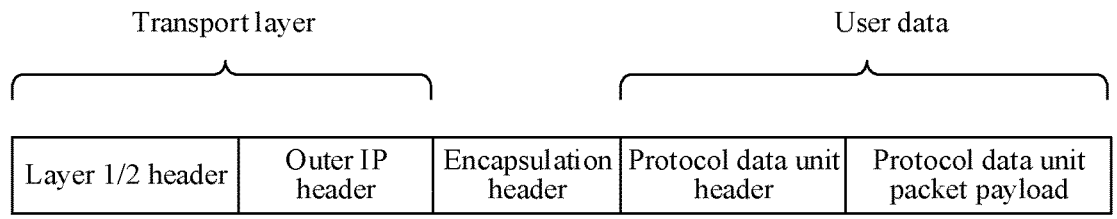
FIG. 4 is a schematic diagram of a data format in a class-based transmission mode according to an embodiment of the present invention.
Figure 5:
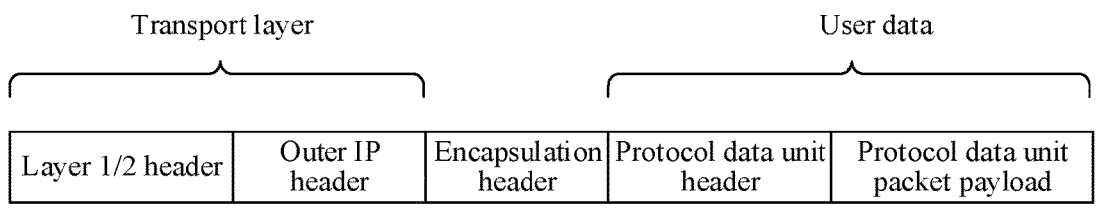
FIG. 5 is a schematic diagram of a data format in another class-based transmission mode according to an embodiment of the present invention.
Figure 6:
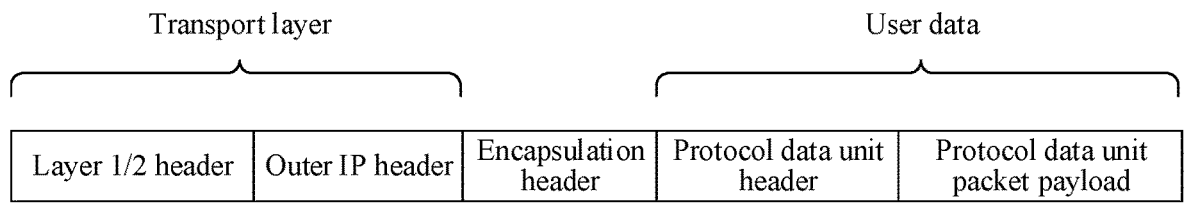
FIG. 6 is a schematic diagram of a data format in another class-based transmission mode according to an embodiment of the present invention.
Figure 7:
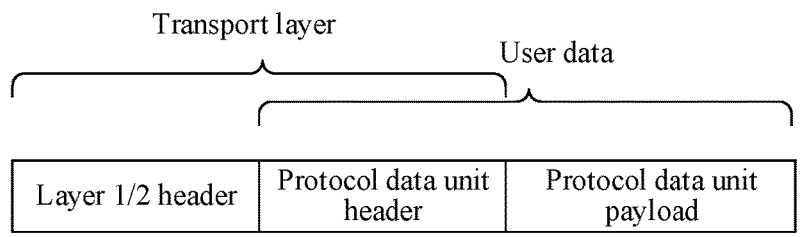
FIG. 7 is a schematic diagram of a data format in another class-based transmission mode according to an embodiment of the present invention.

The target field includes a reference identifier used to identify a session between the UE and the user plane-gateway in the core network. The reference identifier is usually located in an outer IP header (outer IP header) field, an encapsulation header (encapsulation header) field, a protocol data unit header (PDU header) field, and the like. The reference identifier is usually a bearer identifier (bearer ID), a flow identifier (flow ID), a Media Access Control (MAC) identifier of hardware, a session identifier, an Internet Protocol (IP) address of the UE, an IP address of the access network device, an access network identifier of the access network, an identifier of the other party in end-to-end communication, an IP address of the other party in end-to-end communication, a quality of service (QoS) identifier, an international mobile subscriber identity (IMSI), an international mobile equipment identity (IMEI), an Internet Protocol (IP) multimedia private identity (IMPI), an IP multimedia public identity (IMPU), a temporary mobile subscriber identity (TMSI), a mobile phone number, a globally unique temporary UE identity (GUTI), or the like. Information used to identify a session between the UE and the user plane-gateway in the core network may be located in different fields in different session data transmission modes. Several session data transmission modes are listed below as examples. Mode 1: As shown in FIG. 4, a session involves class-based transmission based on quality of service class (QoS class). A protocol data unit (English: Protocol data unit, PDU for short) includes an L1/L2 header (L1/L2 header) field, an outer IP header (Outer IP header) field, an encapsulation header (Encapsulation header) field, a protocol data unit header (PDU header) field, and a protocol data unit payload (PDU payload) field. A session to which the protocol data unit belongs is indicated together by the outer IP header field and the encapsulation header field. To be specific, the reference identifier is located in the outer IP header field and the encapsulation header field. Mode 2: As shown in FIG. 5, a session involves class-based transmission based on a protocol data unit session (PDU session). A protocol data unit includes an L1/L2 header field, an outer IP header field, an encapsulation header field, a PDU header field, and a PDU payload field. A session to which the protocol data unit belongs is indicated by the encapsulation header field. To be specific, the reference identifier is located in the encapsulation header field. Mode 3: As shown in FIG. 6, a session involves class-based transmission based on an per node-level session (Per Node-level tunnel). A protocol data unit includes an L1/L2 header field, an outer IP header field, an encapsulation header field, a PDU header field, and a PDU payload field. A session to which the protocol data unit belongs is indicated by the PDU header field. To be specific, the reference identifier is located in a PDU header. Mode 4: As shown in FIG. 7, a session involves class-based transmission based on a software defined networking-based approach (SDN-based Approach). A protocol data unit includes an L 1/L2 header field, a PDU header field, and a PDU payload field. A session to which the protocol data unit belongs is indicated by the PDU header field. To be specific, the reference identifier is located in a PDU header.

The target field may include at least one of an outer IP header field, an encapsulation header field, and a PDU header field. For example, if different sessions can be distinguished from each other based on information in the encapsulation header field, the encapsulation header field is protected by using the air interface protection key. If different sessions can be distinguished from each other based on information in the PDU header field, the PDU header field is protected by using the air interface protection key. If different sessions can be distinguished from each other based on information in the encapsulation header field and the PDU header field, the encapsulation header field and the PDU header field are protected by using the air interface protection key. Generally, one or more fields that are to be protected are defined in advance in a standard.

Step S307: The UE sends the uplink protocol data unit with the protected target field to the AN.

Step S308: The AN receives the uplink protocol data unit with the protected target field and parses the target information in the uplink protocol data unit by using the air interface protection key.

In some embodiments, if the process of protecting the uplink protocol data unit by the UE includes encryption protection, the parsing herein correspondingly includes a decryption operation. If the process of protecting the uplink protocol data unit by the UE includes integrity protection, the parsing herein correspondingly includes an operation of verifying correctness of a message authentication code. For both the decryption operation and the operation of verifying correctness of a message authentication code, refer to the foregoing related descriptions of an encryption protection technology and an integrity protection technology. After parsing out information in the target field of the uplink packet, the AN encapsulates the uplink protocol data unit again and sends the uplink protocol data unit to the core network.

Step S309: The AN protects target information in a downlink protocol data unit by using the air interface protection key.

In some embodiments, for the principle of step S309, refer to the related description of step S306.

Step S310: The AN sends the downlink protocol data unit with the protected target field to the UE.

Step S311: The UE receives the downlink protocol data unit with the protected target field and parses the target field in the downlink protocol data unit by using the air interface protection key.

In some embodiments, for the principle of step S311, refer to the related description of step S308.

It should be noted that steps S301 to S311 basically can be performed in the described sequence. However, implementation of the solution is not affected if positions of some steps are adjusted. For example, steps S309 to S311 may be performed together after step S305 and before step S306. In brief, if a solution obtained after positions of some steps are adjusted is logically valid, the solution still belongs to this embodiment of the present invention.

Figure 9:
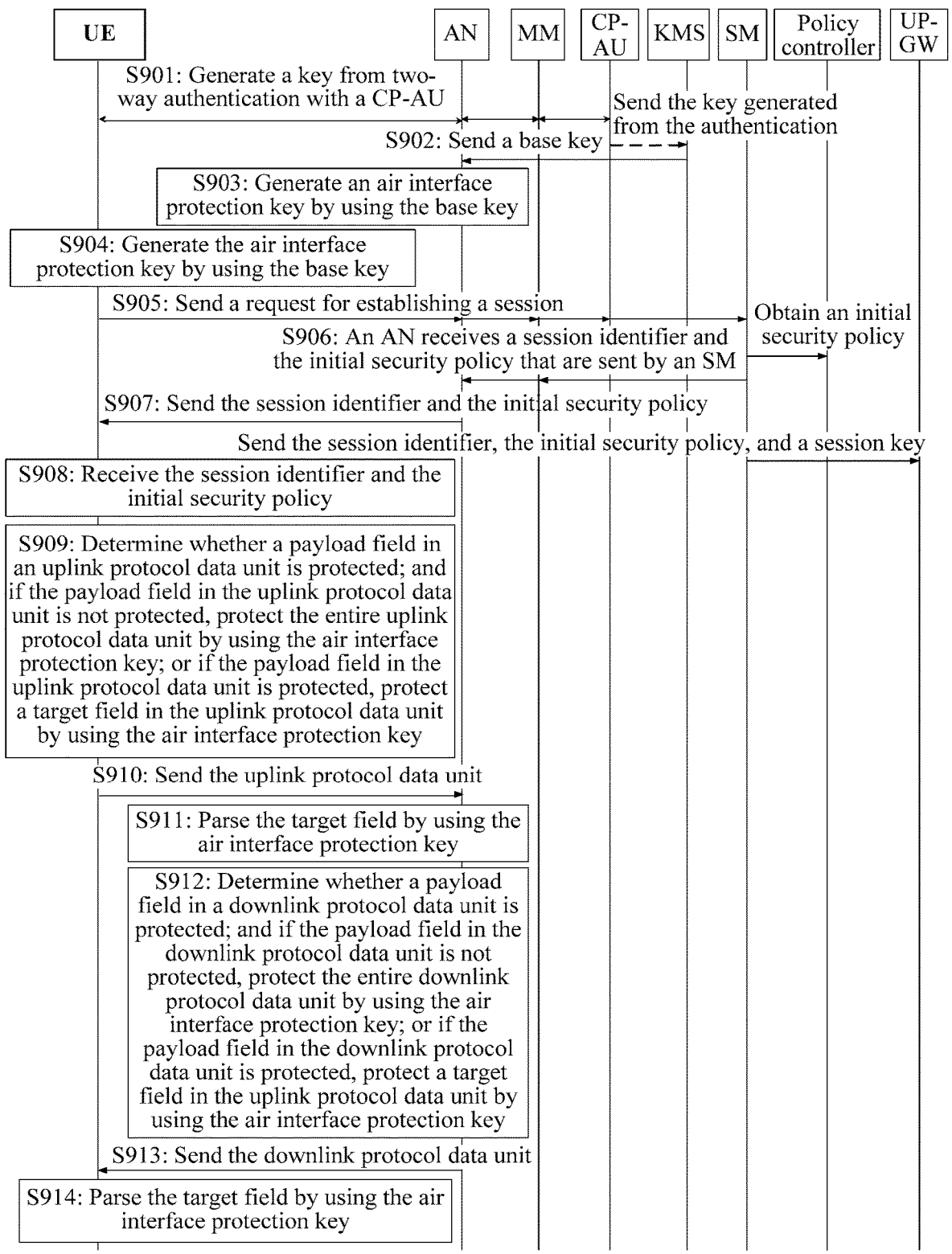
FIG. 9 is a flowchart of another data transmission method according to an embodiment of the present invention.
Figure 10:
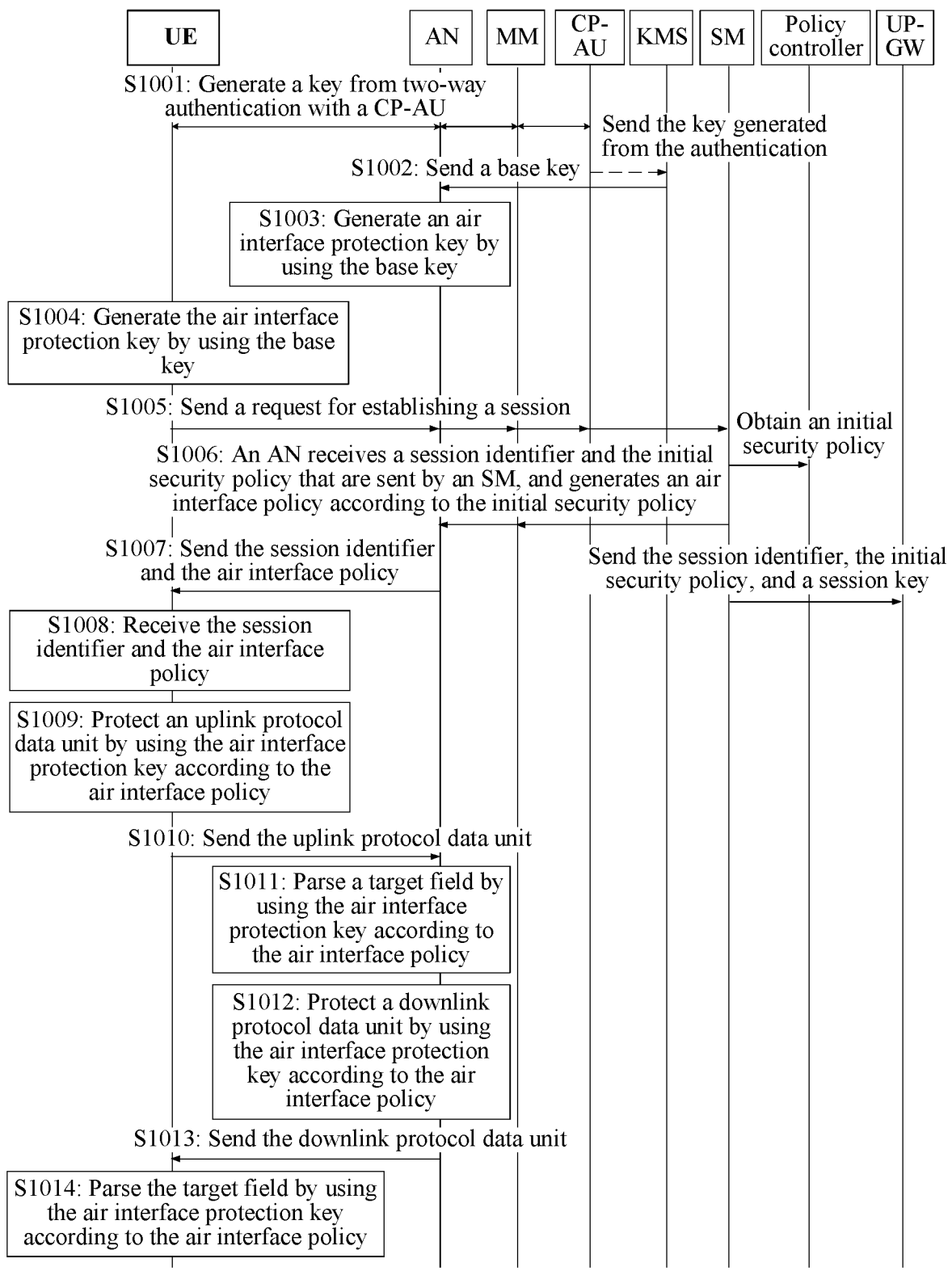
FIG. 10 is a flowchart of another data transmission method according to an embodiment of the present invention.

A person skilled in the art tends to establish an initial session security policy corresponding to a session during establishment of the session. In the framework of the embodiment described in steps S301 to S311, several more specific embodiments shown in FIG. 8, FIG. 9, and FIG. 10 are described below with reference to the initial security policy.

Figure 8:
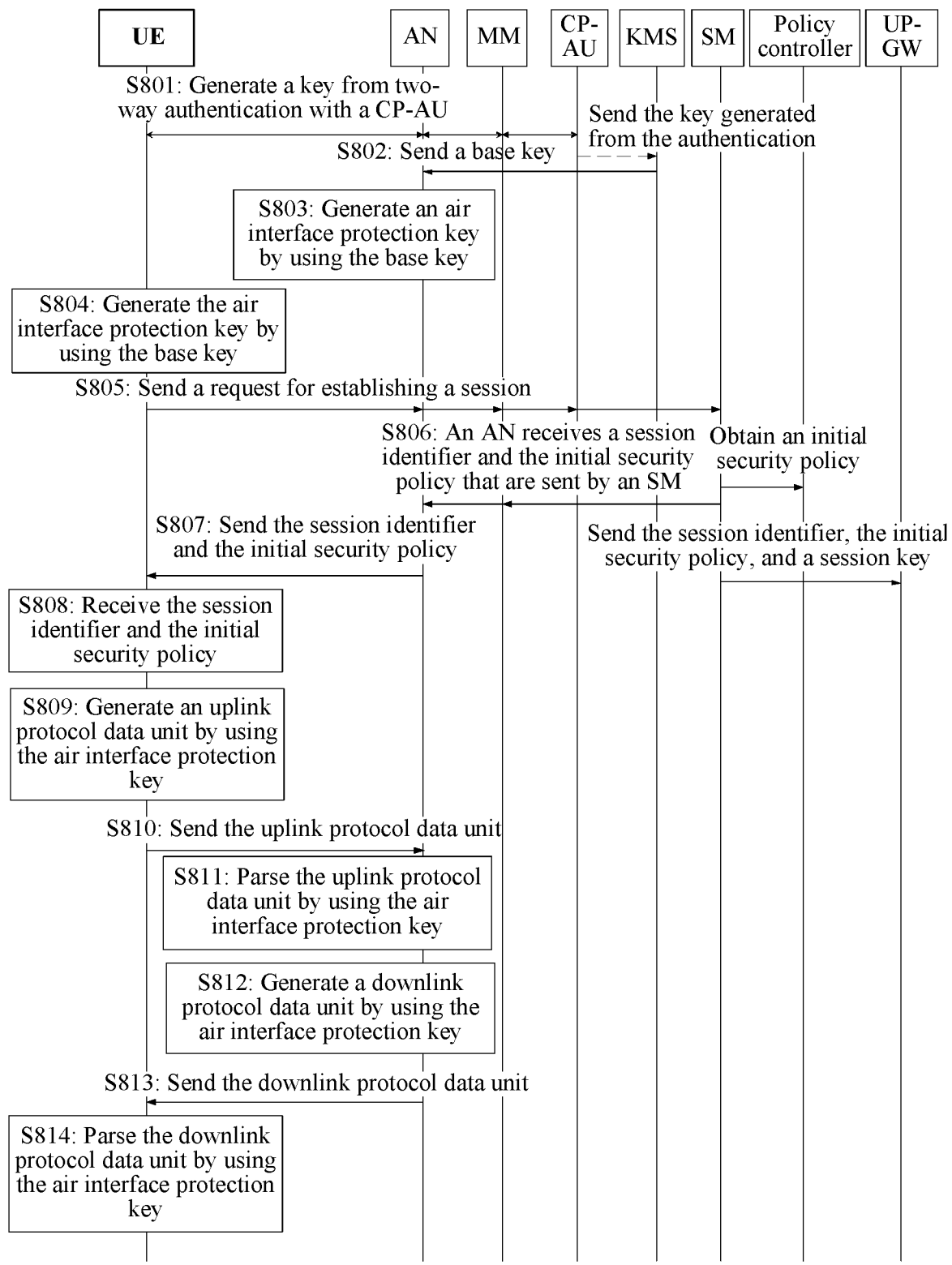
FIG. 8 is a flowchart of another data transmission method according to an embodiment of the present invention.

FIG. 8 is a flowchart of a data transmission method according to an embodiment of the present invention. The UE directly protects the target field in the uplink protocol data unit by using the air interface protection key regardless of whether a payload field in the uplink protocol data unit is protected. Correspondingly, the AN directly protects the target field in the downlink protocol data unit by using the air interface protection key regardless of whether a payload field in the downlink protocol data unit is protected. FIG. 8 is used as an example. The method includes but is not limited to the following steps.

Step S801: The UE and the CP-AU perform two-way authentication. The CP-AU sends a key K0 obtained from the two-way authentication to the KMS, and the KMS manages K0. Alternatively, a function of the KMS may be integrated in the CP-AU. In this case, the CP-AU does not need to send K0 to the KMS. K0 may be a key directly obtained after the authentication succeeds, or may be a key obtained after derivation is performed one or more times on the directly obtained key.

Step S802: The KMS sends a base key K_AN to the AN. In some embodiments, the KMS sends the base key K_AN to an MM in advance, and the MM subsequently sends the base key K_AN to the AN. K_AN may be K0, or may be a key obtained after derivation is performed one or more times on K0.

Step S803: The AN performs derivation on K_AN according to a preset rule to obtain an air interface protection key (for example, an encryption key K_Anec or an integrity protection key K_ANint).

Step S804: The UE similarly performs derivation on K_AN according to the preset rule to obtain the air interface protection key. When K_AN is a key derived from K0, a manner in which the UE derives K_AN is the same as a manner in which the KMS derives K_AN.

Step S805: The UE sends a request for establishing a session. Correspondingly, the UE and a network element in the core network perform a series of negotiations. A session identifier (session ID) of the session, an initial security policy associated with the session, and a session key (K_session) that is generated according to a rule defined in the initial security policy are generated during the negotiations. Generation rules of some keys used in the session are defined in the initial security policy. The UP-GW in the core network obtains information such as the session identifier, the initial security policy, and the session key.

Step S806: The AN receives the session identifier and the initial security policy that are sent by an SM in the core network.

Step S807: The AN sends the session identifier and the initial security policy to the UE.

Step S808: The UE receives the session identifier and the initial security policy. The session between the UE and the UP-GW is established successfully. The session established between the UE and the UP-GW may be referred to as a target session.

Information and operations other than those used to establish the target session in steps S805 to S808 are all optional.

Step S809: The UE generates an uplink protocol data unit of the target session. During the generation of the uplink protocol data unit, a target field is protected by using the air interface protection key. The target field includes at least one of an outer IP header field, an encapsulation header field, and a PDU header field. The protection includes at least one of encryption protection and integrity protection.

Step S810: The UE sends the uplink protocol data unit with the protected target field to the AN by using an air interface transmission technology.

Step S811: The AN parses out information of the target field in the uplink protocol data unit by using the air interface protection key. For example, the AN decrypts the target field under encryption protection by using the encryption key. For another example, the AN first verifies integrity of the encrypted target field by using the integrity protection key, and then decrypts the encrypted target field by using an air interface encryption key. For another example, the AN first decrypts the encrypted target field, and then verifies the target field by using the integrity protection key and obtains the target field. The AN may encapsulate the information that is parsed out and information in other fields into a complete protocol data unit, and send the protocol data unit to the core network.

In some embodiments, the AN may allocate a corresponding air interface identifier to the UE in advance and send the air interface identifier to the UE. If subsequently a device sends the air interface identifier corresponding to the UE when sending an uplink protocol data unit to the AN, it indicates that the device sending the uplink protocol data unit is the UE. The AN may have generated a plurality of air interface protection keys that correspond to different devices respectively. An air interface protection key corresponding to the UE is used to protect data in the uplink protocol data unit sent by the UE. An air interface protection key corresponding to another device (or referred to as another UE) is used to protect data in an uplink protocol data unit sent by the another device. If the AN obtains the air interface identifier corresponding to the UE while receiving an uplink protocol data unit, the AN may determine the air interface protection key corresponding to the UE in the plurality of air interface protection keys corresponding to the devices and protect the uplink protocol data unit of the UE by using the air interface protection key. The air interface identifier may be a cell radio network temporary identifier (English: Cell Radio Network Temporary Identifier, C-RNTI for short), a carrier frequency channel number (for example, a carrier frequency channel number in 4G is represented as: English: E-UTRA Absolute Radio Frequency Channel Number, EARFCN for short), or the like.

In some embodiments, the AN may allocate a corresponding air interface transmission manner to the UE and send indication information to the UE to inform the UE of the air interface transmission manner to which the UE corresponds. The AN may also allocate air interface transmission manners to other devices. If an air interface transmission manner of an uplink protocol data unit received by the AN is the air interface transmission manner corresponding to the UE, it is determined that the uplink protocol data unit is sent by the UE. Therefore, an air interface protection key corresponding to the UE is selected from a plurality of air interface protection keys (where each of the plurality of air interface protection keys corresponds to one device) generated in advance to protect the uplink protocol data unit. The air interface transmission manner includes a codeword corresponding to each user equipment in a code division multiple access (English: Code Division Multiple Access, CDMA for short) technology, a modulation scheme used by the UE to send data over an air interface, or the like.

Step S812: The AN generates a downlink protocol data unit of the target session. During the generation of the downlink protocol data unit, a target field is protected by using the air interface protection key. The target field includes at least one of an outer IP header field, an encapsulation header field, and a PDU header field. The protection includes at least one of encryption protection and integrity protection.

Step S813: The AN sends the downlink protocol data unit with the protected target field to the UE.

Step S814: The UE parses out information of the target field in the downlink protocol data unit by using the air interface protection key.

In some embodiments, the air interface protection key may be generated after the session is established. Optionally, a protection algorithm and the air interface protection key are determined by using a negotiation mechanism of an air interface protection algorithm in 4G.

FIG. 9 is a flowchart of a data transmission method according to an embodiment of the present invention. The UE determines in advance whether a payload field in the uplink protocol data unit is protected; and if the payload field in the uplink protocol data unit is not protected, the UE protects the uplink protocol data unit by using the air interface protection key; or if the payload field in the uplink protocol data unit is protected, the UE performs the operation of protecting a target field in an uplink protocol data unit by using the air interface protection key. Correspondingly, the access network device also determines in advance whether a payload field in the downlink protocol data unit is protected; and if the payload field in the downlink protocol data unit is not protected, the access network device is configured to protect the downlink protocol data unit by using the air interface protection key; or if the payload field in the downlink protocol data unit is protected, the access network device performs the operation of protecting target information in the downlink protocol data unit by using the air interface protection key. FIG. 9 is used as an example. The method includes but is not limited to the following steps.

Step S901: The UE and the CP-AU perform two-way authentication. The CP-AU sends a key K0 obtained from the two-way authentication to the KMS, and the KMS manages K0. Alternatively, a function of the KMS may be integrated in the CP-AU. In this case, the CP-AU does not need to send K0 to the KMS. K0 may be a key directly obtained after the authentication succeeds, or may be a key obtained after derivation is performed one or more times on the directly obtained key.

Step S902: The KMS sends a base key K_AN to the AN. Alternatively, the KMS sends the base K_AN to an MM in advance, and the MM subsequently sends the base key K_AN to the AN. K_AN may be K0, or may be a key obtained after derivation is performed one or more times on K0.

Step S903: The AN performs derivation on K_AN according to a preset rule to obtain an air interface protection key (for example, an encryption key K_Anec or an integrity protection key K_ANint).

Step S904: The UE similarly performs derivation on K_AN according to the preset rule to obtain the air interface protection key. When K_AN is a key derived from K0, a manner in which the UE derives K_AN is the same as a manner in which the KMS derives K_AN.

Step S905: The UE sends a request for establishing a session. Correspondingly, the UE and a network element in the core network perform a series of negotiations. A session identifier (session ID) of the session, an initial security policy associated with the session, and a session key (K_session) that is generated according to a rule defined in the initial security policy are generated during the negotiations. Generation rules of some keys used in the session are defined in the initial security policy. The UP-GW in the core network obtains information such as the session identifier, the initial security policy, and the session key.

Step S906: The AN receives the session identifier and the initial security policy that are sent by an SM in the core network.

Step S907: The AN sends the session identifier and the initial security policy to the UE.

Step S908: The UE receives the session identifier and the initial security policy. The session between the UE and the UP-GW is established successfully. The session established between the UE and the UP-GW may be referred to as a target session.

Information and operations other than those used to establish the target session in steps S905 to S908 are all optional.

Step S909: The UE generates an uplink protocol data unit of the target session. During the generation of the uplink protocol data unit, the UE determines whether a payload field in the uplink protocol data unit is protected. In a solution, the UE determines an initial security policy corresponding to the target session based on the target session; and then the UE can determine, according to the initial security policy, whether the payload field has been protected according to a rule defined in the initial security policy. In another solution, the UE can directly determine, based on a data format of the uplink protocol data unit, whether the payload field has been encrypted. An uplink protocol data unit with a payload field protected by using a key and an uplink protocol data unit with an unprotected payload field have different formats.

If the payload field is not protected, the UE protects the entire uplink protocol data unit by using the air interface protection key; and then sends the entire uplink protocol data unit to the AN. Correspondingly, the AN parses the encrypted uplink protocol data unit by using the air interface protection key to obtain information in the uplink protocol data unit.

If the payload field is protected, the UE protects the target field by using the air interface protection key and performs subsequent steps S910 and S911. The target field includes at least one of an outer IP header field, an encapsulation header field, and a PDU header field. The protection includes at least one of encryption protection and integrity protection.

Step S910: The UE sends the uplink protocol data unit with the protected target field to the AN by using an air interface transmission technology.

Step S911: The AN parses out information of the target field in the uplink protocol data unit by using the air interface protection key. For example, the AN decrypts the target field under encryption protection by using the encryption key. For another example, the AN first verifies integrity of the encrypted target field by using the integrity protection key, and then decrypts the encrypted target field by using an air interface encryption key. For another example, the AN first decrypts the encrypted target field, and then verifies the target field by using the integrity protection key and obtains the target field. The AN may encapsulate the information that is parsed out and information in other fields into a complete protocol data unit, and send the protocol data unit to the core network.

In some embodiments, the AN may allocate a corresponding air interface identifier to the UE in advance and send the air interface identifier to the UE. If subsequently a device sends the air interface identifier corresponding to the UE when sending an uplink protocol data unit to the AN, it indicates that the device sending the uplink protocol data unit is the UE. The AN may have generated a plurality of air interface protection keys that correspond to different devices respectively. An air interface protection key corresponding to the UE is used to protect data in the uplink protocol data unit sent by the UE. An air interface protection key corresponding to another device (or referred to as another UE) is used to protect data in an uplink protocol data unit sent by the another device. If the AN obtains the air interface identifier corresponding to the UE while receiving an uplink protocol data unit, the AN may determine the air interface protection key corresponding to the UE in the plurality of air interface protection keys corresponding to the devices and protect the uplink protocol data unit of the UE by using the air interface protection key. The air interface identifier may be a cell radio network temporary identifier (English: Cell Radio Network Temporary Identifier, C-RNTI for short), a carrier frequency channel number (for example, a carrier frequency channel number in 4G is represented as: English: E-UTRA Absolute Radio Frequency Channel Number, EARFCN for short), or the like.

In some embodiments, the AN may allocate a corresponding air interface transmission manner to the UE and send indication information to the UE to inform the UE of the air interface transmission manner to which the UE corresponds. The AN may also allocate air interface transmission manners to other devices. If an air interface transmission manner of an uplink protocol data unit received by the AN is the air interface transmission manner corresponding to the UE, it is determined that the uplink protocol data unit is sent by the UE. Therefore, an air interface protection key corresponding to the UE is selected from a plurality of air interface protection keys (where each of the plurality of air interface protection keys corresponds to one device) generated in advance to protect the uplink protocol data unit. The air interface transmission manner includes a codeword corresponding to each user equipment in a CDMA technology, a modulation scheme used by the UE to send data over an air interface, or the like.

Step S912: The AN generates a downlink protocol data unit of the target session. During the generation of the downlink protocol data unit, the AN determines whether a payload field in the downlink protocol data unit is protected. In a solution, the AN determines an initial security policy corresponding to the target session based on the target session; and then the AN can verify, according to the initial security policy, whether the payload field has been protected by using a key generated according to a rule defined in the initial security policy. In another solution, the AN can directly determine, based on a data format of the downlink protocol data unit, whether the payload field has been encrypted. A downlink protocol data unit with a payload field protected by using a key and a downlink protocol data unit with an unprotected payload field have different formats.

If the payload field is not protected, the AN protects the downlink protocol data unit by using the air interface protection key; and then sends the entire uplink protocol data unit to the UE. Correspondingly, the UE parses the encrypted uplink protocol data unit by using the air interface protection key to obtain information in the downlink protocol data unit.

If payload field is protected, the AN protects the target field by using the air interface protection key and performs subsequent steps S913 and S914. The target field includes at least one of an outer IP header field, an encapsulation header field, and a PDU header field. The protection includes at least one of encryption protection and integrity protection.

Step S913: The AN sends the downlink protocol data unit with the protected target field to the UE.

Step S914: The UE parses out information of the target field in the downlink protocol data unit by using the air interface protection key.

In some embodiments, the air interface protection key may be generated after the session is established. Optionally, a protection algorithm and the air interface protection key are determined by using a negotiation mechanism of an air interface protection algorithm in 4G.

FIG. 10 is a flowchart of a data transmission method according to an embodiment of the present invention. The UE and the AN need to follow a corresponding rule when protecting a protocol data unit and parsing the protocol data unit by using the air interface protection key. The rule may be referred to as an air interface policy. It may be understood that if the protocol data unit is protected according to the rule defined in the air interface policy, a reverse operation needs to be performed with reference to the air interface policy to parse the protected protocol data unit successfully. To be specific, that the AN protects the target information in the downlink protocol data unit by using the air interface protection key is In some embodiments: protecting the target field in the downlink protocol data unit by using the air interface protection key according to the rule defined in the air interface policy obtained in advance, where a data protection rule is defined in the air interface policy. That the UE parses the target field in the downlink protocol data unit by using the air interface protection key is In some embodiments: parsing the target field in the downlink protocol data unit by using the air interface protection key according to the rule defined in the air interface policy obtained in advance. That the UE protects the target field in the uplink protocol data unit by using the air interface protection key is In some embodiments: protecting the target field in the uplink protocol data unit by using the air interface protection key according to the rule defined in the air interface policy. That the AN parses the target information in the uplink protocol data unit by using the air interface protection key is In some embodiments: parsing the target information in the uplink protocol data unit by using the air interface protection key according to the rule defined in the air interface policy.

In a first case, the AN is configured to receive an initial security policy from the core network, the AN generates the air interface policy according to the initial security policy, the AN sends the air interface policy to the UE, and the UE receives the air interface policy, to ensure that both the AN and the UE have the air interface policy. In a second case, the UE is configured to receive an initial security policy from the core network, the UE generates the air interface policy according to the initial security policy, the UE sends the air interface policy to the AN, and the AN receives the air interface policy, to ensure that both the AN and the UE have the air interface policy. In a third case, the AN receives an initial security policy from the core network and forwards the initial security policy to the UE. The UE and the AN then separately generate the air interface policy according to the initial security policy, to ensure that both the UE and the AN have the air interface policy.

It should be noted that each network element may have a respective security requirement. The security requirement represents key algorithms that the network element can accept, key lengths that the network element can accept, key update periods that the network element can accept, and the like. The initial security policy is a solution that is obtained by the core network according to a security requirement of a related network element and that can satisfy a key algorithm, a key length, and a key update period required by the related network element. The related network element (for example, a key management network element and a mobility management network element) is In some embodiments at least one network element used when the UE transmits data in a network. A generation rule of a key used in a target session and a protection manner of the target session are defined in the initial security policy. The target session is a session between the UE and the user plane-gateway after the UE and the user plane-gateway are mutually authenticated. The air interface policy is generated with reference to the initial security policy. For a reference manner, a parameter (for example, a key algorithm) in the initial security policy may continue to be used, or a parameter in the initial security policy may be adjusted to obtain a parameter in the air interface policy, or another manner may be used. In brief, information in the initial security policy is used to obtain the air interface policy. FIG. 10 is used as an example. The method includes but is not limited to the following steps.

Step S1001: The UE and the CP-AU perform two-way authentication. The CP-AU sends a key K0 obtained from the two-way authentication to the KMS, and the KMS manages K0. Alternatively, a function of the KMS may be integrated in the CP-AU. In this case, the CP-AU does not need to send K0 to the KMS. K0 may be a key directly obtained after the authentication succeeds, or may be a key obtained after derivation is performed one or more times on the directly obtained key.

Step S1002: The KMS sends a base key K_AN to the AN. Alternatively, the KMS sends the base K_AN to an MM in advance, and the MM subsequently sends the base key K_AN to the AN. K_AN may be K0, or may be a key obtained after derivation is performed one or more times on K0.

Step S1003: The AN performs derivation on K_AN according to a preset rule to obtain an air interface protection key (for example, an encryption key K_Anec or an integrity protection key K_ANint).

Step S1004: The UE similarly performs derivation on K_AN according to the preset rule to obtain the air interface protection key. When K_AN is a key derived from K0, a manner in which the UE derives K_AN is the same as a manner in which the KMS derives K_AN.

Step S1005: The UE sends a request for establishing a session. Correspondingly, the UE and a network element in the core network perform a series of negotiations. A session identifier (session ID) of the session, an initial security policy associated with the session, and a session key (K_session) that is generated according to a rule defined in the initial security policy are generated during the negotiations. Generation rules of some keys used in the session are defined in the initial security policy. The UP-GW in the core network obtains information such as the session identifier, the initial security policy, and the session key.

Step S1006: The AN receives the session identifier and the initial security policy that are sent by an SM in the core network, and then generates an air interface policy according to the initial security policy.

Step S1007: The AN sends the session identifier, the initial security policy, and the air interface policy to the UE.

Step S1008: The UE receives the session identifier, the air interface policy, and the initial security policy. The session between the UE and the UP-GW is established successfully. The session established between the UE and the UP-GW may be referred to as a target session.

Step S1009: The UE generates an uplink protocol data unit of the target session. During the generation of the uplink protocol data unit, the UE protects the target field by using the air interface protection key according to the rule defined in the air interface policy. The target field includes at least one of an outer IP header field, an encapsulation header field, and a PDU header field. The protection includes at least one of encryption protection and integrity protection.

Step S1010: The UE sends the uplink protocol data unit with the protected target field to the AN by using an air interface transmission technology.

Step S1011: The AN parses out information of the target field in the uplink protocol data unit by using the air interface protection key according to the rule defined in the air interface policy. For example, the AN decrypts the target field under encryption protection by using the encryption key. For another example, the AN first verifies integrity of the encrypted target field by using the integrity protection key, and then decrypts the encrypted target field by using an air interface encryption key. For another example, the AN first decrypts the encrypted target field, and then verifies the target field by using the integrity protection key and obtains the target field. The AN may encapsulate the information that is parsed out and information in other fields into a complete protocol data unit, and send the protocol data unit to the core network.

In some embodiments, the AN may allocate a corresponding air interface identifier to the UE in advance and send the air interface identifier to the UE. If subsequently a device sends the air interface identifier corresponding to the UE when sending an uplink protocol data unit to the AN, it indicates that the device sending the uplink protocol data unit is the UE. The AN may have generated a plurality of air interface protection keys that correspond to different devices respectively. An air interface protection key corresponding to the UE is used to protect data in the uplink protocol data unit sent by the UE. An air interface protection key corresponding to another device (or referred to as another UE) is used to protect data in an uplink protocol data unit sent by the another device. If the AN obtains the air interface identifier corresponding to the UE while receiving an uplink protocol data unit, the AN may determine the air interface protection key corresponding to the UE in the plurality of air interface protection keys corresponding to the devices and protect the uplink protocol data unit of the UE by using the air interface protection key. The air interface identifier may be a cell radio network temporary identifier (English: Cell Radio Network Temporary Identifier, C-RNTI for short), a carrier frequency channel number (for example, a carrier frequency channel number in 4G is represented as: English: E-UTRA Absolute Radio Frequency Channel Number, EARFCN for short), or the like.

In some embodiments, the AN may allocate a corresponding air interface transmission manner to the UE and send indication information to the UE to inform the UE of the air interface transmission manner to which the UE corresponds. The AN may also allocate air interface transmission manners to other devices. If an air interface transmission manner of an uplink protocol data unit received by the AN is the air interface transmission manner corresponding to the UE, it is determined that the uplink protocol data unit is sent by the UE. Therefore, an air interface protection key corresponding to the UE is selected from a plurality of air interface protection keys (where each of the plurality of air interface protection keys corresponds to one device) generated in advance to protect the uplink protocol data unit. The air interface transmission manner includes a codeword corresponding to each user equipment in a CDMA technology, a modulation scheme used by the UE to send data over an air interface, or the like.

Step S1012: The AN generates a downlink protocol data unit of the target session. During the generation of the downlink protocol data unit, the AN protects the target field by using the air interface protection key according to the rule defined in the air interface policy. The target field includes at least one of an outer IP header field, an encapsulation header field, and a PDU header field. The protection includes at least one of encryption protection and integrity protection.

Step S1013: The AN sends the downlink protocol data unit with the protected target field to the UE.

Step S1014: The UE parses out information of the target field in the downlink protocol data unit by using the air interface protection key according to the rule defined in the air interface policy.

It should be noted that content that needs to be protected in a protocol data unit (including the uplink protocol data unit and the downlink protocol data unit) may be further defined in the air interface policy. A defined solution may be as follows:

First solution: Whether a payload field is protected is determined. If the payload field is not protected, the entire protocol data unit is protected. If the payload field is protected, the operation of protecting the target field is performed.

Second solution: Regardless of whether the payload field is protected, the operation of protecting the target field is performed.

In an optional solution, the air interface protection key may be generated after the session is established. In some embodiments, a protection algorithm and the air interface protection key are determined by using a negotiation mechanism of an air interface protection algorithm in 4G. Alternatively, the air interface policy is determined according to the initial security policy, and the air interface protection key is then generated based on a security algorithm identifier defined in the air interface policy. Alternatively, the air interface policy is determined according to the initial security policy, and the air interface protection key is generated based on the base key.

In the method described in FIG. 3, the UE and the AN negotiate the air interface protection key in advance, and then use the air interface protection key to protect a field that is included in a protocol data unit and that includes information used to identify a session between the UE and a user plane-gateway in the core network, so that an attacker cannot easily obtain the information used to identify the session between the UE and the user plane-gateway in the core network in an air interface stage, and the attacker cannot determine the session based on the information, thereby preventing the session from being attacked.

Figure 11:
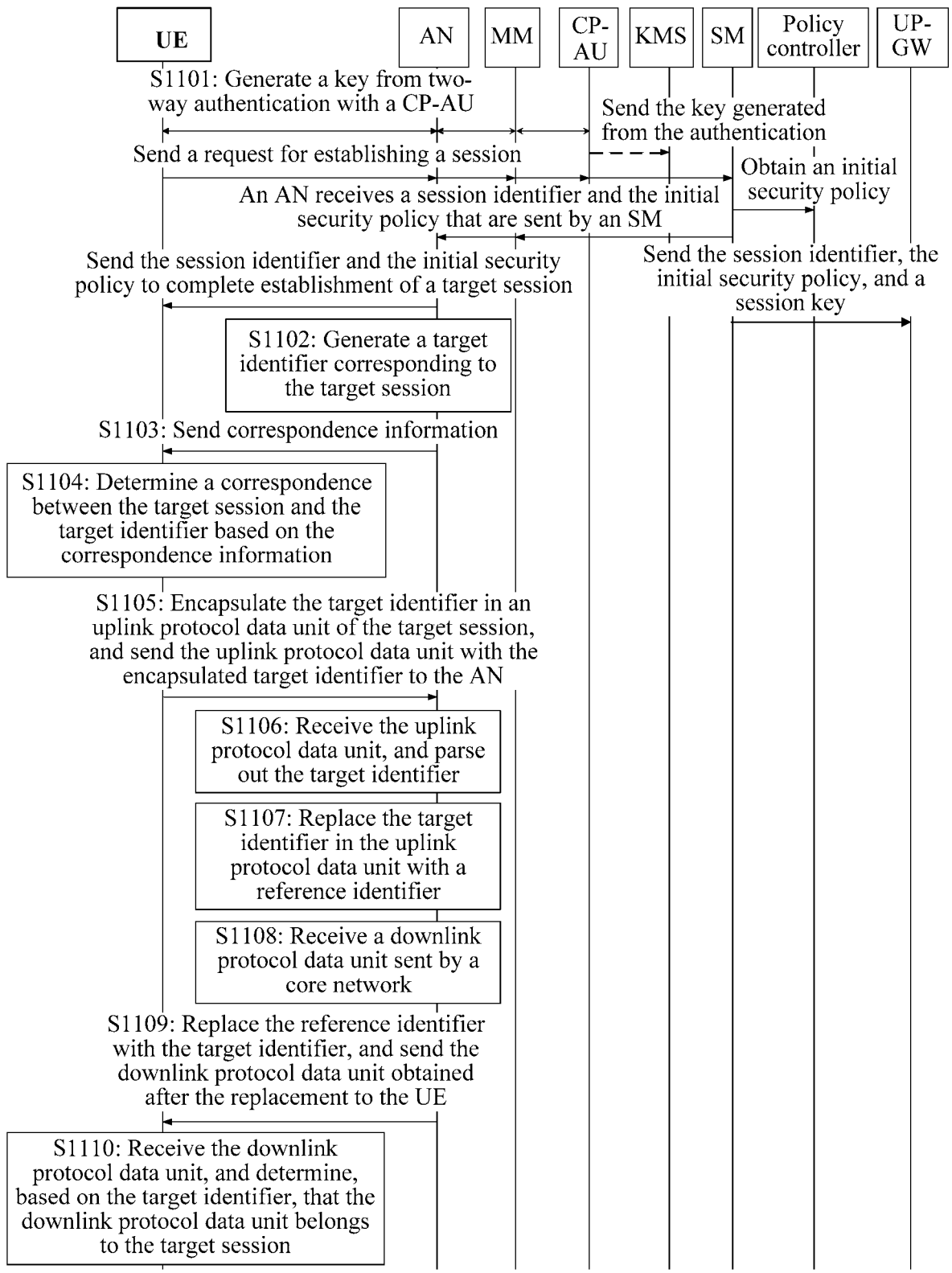
FIG. 11 is a flowchart of another data transmission method according to an embodiment of the present invention.

FIG. 11 is a flowchart of another data transmission method according to an embodiment of the present invention. The method may be implemented based on the communications system 30 in FIG. 3, and include a procedure as follows:

Step S1101: UE and a key management device in a CN perform two-way authentication. After the UE and the key management device in the CN are mutually authenticated, a session is established between the UE and a user plane-gateway UP-GW in the CN. The session may be referred to as a target session. During establishment of the target session, the UE and a network element in the core network perform a series of negotiations. A session identifier (session ID) of the target session, an initial security policy (optional) associated with the session, and a session key (K_session) generated according to a rule defined in the initial security policy are generated during the negotiations. Certainly, if the initial security policy does not exist, the session key may be generated according to another rule. Generation rules of some keys used in the session are defined in the initial security policy. The UP-GW in the core network obtains information such as the session identifier, the initial security policy (optional), and the session key. The network element in the CN further sends the session identifier (session ID) of the target session to the UE. The session identifier sent by the network element in the CN to the UE passes through an AN. The AN determines the target session based on the session identifier.

Step S1102: The AN generates a target identifier corresponding to the target session.

In some embodiments, a rule used to generate the target identifier is not limited herein, provided that the AN and the UE can uniquely correspond to the target session. The target identifier does not need to indicate information such as addresses (for example, an IP address and a MAC address) of the UE and the UP-GW. To be specific, without negotiation with the AN (or the UE), a device other than the AN and the UE cannot know a correspondence between the target identifier and the target session even if the device has intercepted the target identifier. Therefore, the device cannot determine the target session based on the target identifier. The target identifier may be a randomly generated random number or may be an existing identifier such as a C-RNTI or a carrier frequency channel number (for example, a carrier frequency channel number in 4G is represented as: English: E-UTRA Absolute Radio Frequency Channel Number, EARFCN for short).

Step S1103: The AN sends correspondence information to the UE. The AN may send the target identifier to the UE when or after the CN sends signaling of the session identifier to the UE. Alternatively, the AN may send the target identifier and the session identifier together to the UE, so that the UE determines a correspondence.

In some embodiments, the correspondence information indicates a correspondence between the target session and the target identifier.

Step S1104: The UE receives the correspondence information and determines, based on the correspondence information, that the target session corresponds to the target identifier.

Step S1105: The UE encapsulates the target identifier in an uplink protocol data unit of the target session, and sends the uplink protocol data unit with the encapsulated target identifier to the AN. Optionally, a reference identifier used to indicate a session in a protocol data unit is replaced with the target identifier.

In the prior art, when transmitting an uplink protocol data unit, UE encapsulates a reference identifier in the uplink protocol data unit to indicate that the uplink protocol data unit belongs to the target session, and particularly, to inform the UP-GW that the uplink protocol data unit belongs to the target session. However, not only the UE and the AN, but also other devices can use the reference identifier to determine that the uplink protocol data unit belongs to the target session. To be specific, a device other than the UE and the AN can determine that the uplink packet belongs to the target session once the device has intercepted the reference identifier in the uplink packet. The reference identifier is usually located in an outer IP header field, an encapsulation header field, a PDU header field, and the like. The reference identifier is usually a bearer identifier (bearer ID), a flow identifier (flow ID), a Media Access Control (English: Media Access Control, MAC for short) identifier of hardware, a session identifier, an IP address of the UE, an IP address of the access network device, an access network identifier of the access network, an identifier of the other party in end-to-end communication, an IP address of the other party in end-to-end communication, a QoS identifier, an international mobile subscriber identity (English: International Mobile Subscriber Identity, IMSI for short), an international mobile equipment identity (English: International Mobile Equipment Identity, IMEI for short), an Internet Protocol (English: Internet Protocol, IP for short) multimedia private identity (English: IP Multimedia Private Identity, IMPI for short), an IP multimedia public identity (English: IP Multimedia Public Identity, IMPU for short), a temporary mobile subscriber identity (English: Temporary Mobile Subscriber Identity, TMSI for short), a mobile phone number, a globally unique temporary UE identity (English: Globally Unique Temporary UE Identity, GUTI for short), or the like. By contrast, the target identifier does not include information that can clearly indicate a source, a destination, and the like of a packet. In addition, as in the prior art, a payload field further exists in the uplink packet and is used to encapsulate service data. A manner of processing service data may be kept unchanged in this embodiment of the present invention.

Step S1106: The AN receives the uplink protocol data unit.

Step S1107: The AN replaces the target identifier in the uplink protocol data unit with a reference identifier, and sends the uplink protocol data unit obtained after the replacement to the core network.

In some embodiments, the AN receives and parses the uplink protocol data unit. For example, the AN parses information of a packet header field in the protocol data unit to obtain the target identifier in the uplink protocol data unit, and then may determine, based on a prestored correspondence between the target session and the target identifier, that the uplink packet belongs to the target session. Therefore, the AN replaces the target identifier in the uplink packet with a reference identifier, so that the UP-GW can determine, based on the reference identifier, that the uplink protocol data unit belongs to the target session.

Step S1108: The AN receives a downlink protocol data unit sent by the user plane-gateway.

In some embodiments, according to a rule defined in a current communication protocol, any device can use a reference identifier to indicate that a downlink packet belongs to the target session. Therefore, the UP-GW encapsulates the reference identifier in the downlink protocol data unit according to a universal rule to indicate that the downlink packet belongs to the target session.

Step S1109: The AN replaces the reference identifier in the downlink protocol data unit with the target identifier, and sends the downlink protocol data unit obtained after the replacement to the UE.

In some embodiments, the AN receives and parses the downlink protocol data unit. The AN can determine that the downlink protocol data unit belongs to the target session when parsing out the reference identifier. The AN replaces the target identifier corresponding to the target session with the reference identifier, and sends the downlink protocol data unit obtained after the replacement to the UE.

Step S1110: The UE receives the downlink protocol data unit and determines, based on the target identifier, that the downlink protocol data unit belongs to the target session.

In some embodiments, the UE receives and parses the downlink protocol data unit. The UE can determine that the downlink packet belongs to the target session corresponding to the target identifier when parsing out the target identifier from the downlink protocol data unit. The downlink protocol data unit usually further has a payload field. Service data is encapsulated in the field. A user may further parse out the service data to perform a related operation based on the service data.

In the method described in FIG. 11, a session protection mechanism is set in an air interface transmission stage between the UE and the AN. To be specific, after a target session is established between the UE and an UP-GW, the AN and the UE agree on a target identifier used to identify the target session. During transmission of a subsequent packet in an air interface stage, the target identifier is used in the packet to indicate that the packet is from the target session. The target identifier is replaced with a reference identifier (a device other than the AN and the UE can also determine the target session by using the reference identifier) during communication with a core network. In this way, the device other than the AN and the UE cannot deduce that the packet belongs to the target session even if the device has intercepted the target identifier, so that the session is prevented from being attacked.

A session transmission manner is used as an example in the foregoing description. The concept of providing extra protection for a part of information transmitted between the UE and the AN when an end-to-end protection mechanism is used between the UE and a target node may also be applied to a bearer-based transmission manner, a flow-based transmission manner, and the like.

The method in the embodiments of the present invention is described in detail above. For ease of better implementation of the foregoing solutions in the embodiments of the present invention, an apparatus in an embodiment of the present invention is correspondingly provided in the following.

Figure 12:
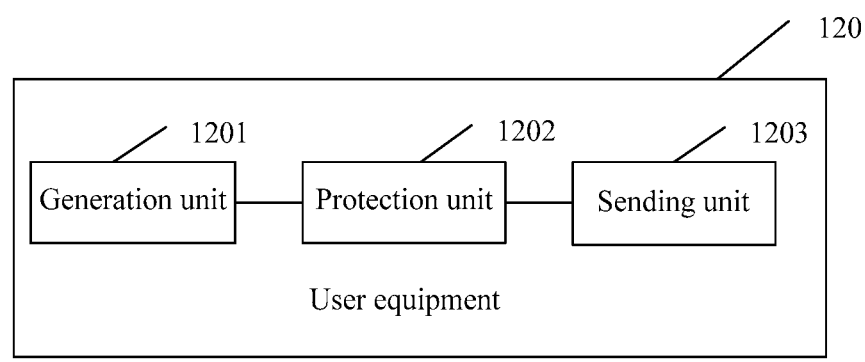
FIG. 12 is a schematic structural diagram of user equipment according to an embodiment of the present invention.

FIG. 12 is a schematic structural diagram of user equipment 120 according to an embodiment of the present invention. The user equipment 120 may include a generation unit 1201, a protection unit 1202, and a sending unit 1203. The units are described below in detail.

The generation unit 1201 is configured to process a base key according to a preset rule to generate an air interface protection key, where the base key is a key generated from two-way authentication between the UE and a core network or a key derived from the key generated from the two-way authentication, and a key management device in the core network is configured to send the base key to an access network device AN, so that the AN processes the base key according to the preset rule to generate the air interface protection key.

The protection unit 1202 is configured to protect a target field in an uplink protocol data unit PDU by using the air interface protection key, where the target field includes information used to identify a session between the UE and a target node, and data of the session between the target node and the UE needs to pass through the AN during transmission.

The sending unit 1203 is configured to send the uplink protocol data unit with the protected target field to the AN, so that the AN parses the target field in the uplink protocol data unit by using the air interface protection key.

By running the foregoing units, the UE and the AN negotiate the air interface protection key in advance, and then use the air interface protection key to protect a field that is included in a protocol data unit and that includes information used to identify a session between the UE and a user plane-gateway in the core network, so that an attacker cannot easily obtain the information used to identify the session between the UE and the user plane-gateway in the core network in an air interface stage, and the attacker cannot determine the session based on the information, thereby preventing the session from being attacked.

In an solution un accordance with the disclosure, the user equipment further includes a first receiving unit. The first receiving unit is configured to: receive, by the UE, a downlink protocol data unit sent by the AN, and parse a target field in the downlink protocol data unit by using the air interface protection key, where the target field in the downlink protocol data unit has been encrypted by using the air interface protection key.

In another solution un accordance with the disclosure, that the first receiving unit parses the target field in the downlink protocol data unit by using the air interface protection key is In some embodiments: parsing the target field in the downlink protocol data unit by using the air interface protection key according to a rule defined in an air interface policy obtained in advance, where the target field in the downlink protocol data unit has been protected by the AN by using the air interface protection key according to the rule defined in the air interface policy obtained in advance, and a use rule of a key is defined in the air interface policy.

In another solution in accordance with the disclosure, the protection unit is In some embodiments configured to protect the target field in the uplink protocol data unit by using the air interface protection key according to a rule defined in an air interface policy obtained in advance, where the AN is configured to parse the target field by using the air interface protection key according to the rule defined in the air interface policy obtained in advance, and a use rule of a key is defined in the air interface policy.

In another solution in accordance with the disclosure, the user equipment further includes a second receiving unit. The second receiving unit is configured to receive the air interface policy sent by the AN, where the air interface policy is generated by the AN according to an initial security policy, a generation rule of a key used in a target session is defined in the initial security policy, and the target session is a session between the target node and the UE.

In another solution in accordance with the disclosure, the user equipment further includes a determining unit. The determining unit is configured to: determine whether a payload field in the uplink protocol data unit is protected; and if the payload field in the uplink protocol data unit is not protected, trigger the protection unit to protect the uplink protocol data unit by using the air interface protection key; or if the payload field in the uplink protocol data unit is protected, trigger the protection unit to perform the operation of protecting a target field in an uplink protocol data unit PDU by using the air interface protection key by the UE.

In another solution in accordance with the disclosure, the air interface protection key includes at least one of an encryption key and an integrity protection key.

In another solution in accordance with the disclosure, the target field includes at least one of an outer IP header outer IP header field, an encapsulation header encapsulation header field, and a protocol data unit header PDU header field.

In another solution in accordance with the disclosure, the information used to identify the session between the UE and the target node includes at least one of a bearer identifier, a flow identifier, a Media Access Control identifier of hardware, a session identifier, an Internet Protocol address of the UE, an IP address of the access network device, an access network identifier of an access network to which the access network device is connected, an IP address of the UE, a quality of service identifier, an international mobile subscriber identity, an international mobile equipment identity, an Internet Protocol multimedia private identity, an IP multimedia public identity, a temporary mobile subscriber identity, a mobile phone number of the UE, and a globally unique temporary user equipment identity of the UE.

In another solution in accordance with the disclosure, the target node includes a user plane-gateway in the core network, or a service server in the core network, or a server that is on the Internet and that has established a communication connection to a network element in the core network.

It should be noted that for some implementations of the units, further refer to corresponding descriptions of the method embodiments shown in FIG. 3, FIG. 8, FIG. 9, and FIG. 10 correspondingly.

In the user equipment described in FIG. 12, the UE and the AN negotiate the air interface protection key in advance, and then use the air interface protection key to protect a field that is included in a protocol data unit and that includes information used to identify a session between the UE and a user plane-gateway in the core network, so that an attacker cannot easily obtain the information used to identify the session between the UE and the user plane-gateway in the core network in an air interface stage, and the attacker cannot determine the session based on the information, thereby preventing the session from being attacked.

Figure 13:
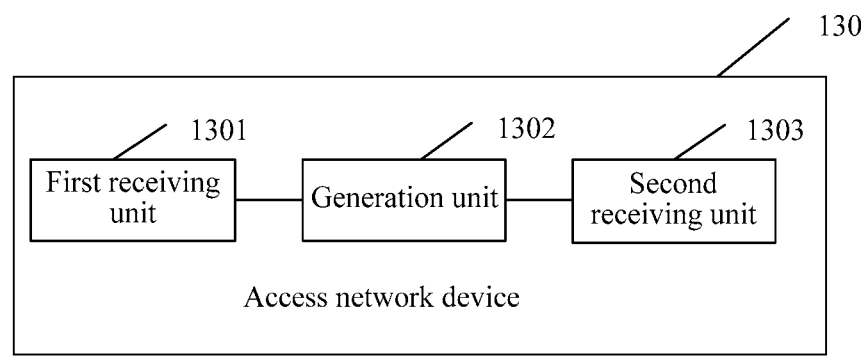
FIG. 13 is a schematic structural diagram of an access network device according to an embodiment of the present invention.

FIG. 13 is a schematic structural diagram of an access network device 130 according to an embodiment of the present invention. The access network device 130 may include a first receiving unit 1301, a generation unit 1302, and a second receiving unit 1303. The units are described below in detail.

The first receiving unit 1301 is configured to receive a base key sent by a key management device in a core network, where the base key is a key generated from two-way authentication between user equipment UE and the core network or a key derived from the key generated from the two-way authentication, and the UE is configured to process the base key according to a preset rule to generate an air interface protection key.

The generation unit 1302 is configured to process the base key according to the preset rule to generate the air interface protection key.

The second receiving unit 1303 is configured to: receive an uplink protocol data unit sent by the UE, and parse a target field in the uplink protocol data unit by using the air interface protection key, where the target field in the uplink protocol data unit has been protected by the UE by using the air interface protection key, the target field includes information used to identify a session between the UE and a target node, and data of the session between the target node and the UE needs to pass through the AN during transmission.

By running the foregoing units, the UE and the AN negotiate the air interface protection key in advance, and then use the air interface protection key to protect a field that is included in a protocol data unit and that includes information used to identify a session between the UE and a user plane-gateway in the core network, so that an attacker cannot easily obtain the information used to identify the session between the UE and the user plane-gateway in the core network in an air interface stage, and the attacker cannot determine the session based on the information, thereby preventing the session from being attacked.

n another solution in accordance with the disclosure, the access network device further includes a protection unit. The protection unit is configured to: protect a target field in a downlink protocol data unit by using the air interface protection key, and send the downlink protocol data unit with the protected target field to the UE, so that the UE parses the target field in the downlink protocol data unit by using the air interface protection key.

In another solution in accordance with the disclosure, the access network device further includes a determining unit. The determining unit is configured to: determine whether a payload field in the downlink protocol data unit is protected; and if the payload field in the downlink protocol data unit is not protected, trigger the protection unit to protect the downlink protocol data unit by using the air interface protection key; or if the payload field in the downlink protocol data unit is protected, trigger the protection unit to perform the operation of protecting a target field in a downlink protocol data unit by using the air interface protection key.

In another solution in accordance with the disclosure, that the protection unit protects the target field in the downlink protocol data unit by using the air interface protection key is In some embodiments: protecting the target field in the downlink protocol data unit by using the air interface protection key according to a rule defined in an air interface policy obtained in advance, where the UE is configured to parse the target field in the downlink protocol data unit by using the air interface protection key according to the rule defined in the air interface policy obtained in advance, and a use rule of a key is defined in the air interface policy.

In another solution in accordance with the disclosure, that the second receiving unit parses the target field in the uplink protocol data unit by using the air interface protection key is In some embodiments:

parsing the target field in the uplink protocol data unit by using the air interface protection key according to a rule defined in an air interface policy obtained in advance, where the target field in the uplink protocol data unit has been protected by the UE by using the air interface protection key according to the rule defined in the air interface policy obtained in advance, and a use rule of a key is defined in the air interface policy.

In another optional solution, the access network device further includes:

a third receiving unit, configured to receive an initial security policy from the core network, where a generation rule of a key used in a target session is defined in the initial security policy, and the target session is a session between the target node and the UE; and a sending unit, configured to: generate the air interface policy according to the initial security policy, and send the air interface policy to the UE.

In another solution in accordance with the disclosure, the air interface protection key includes at least one of an encryption key and an integrity protection key.

In another solution in accordance with the disclosure, the target field includes at least one of an outer IP header outer IP header field, an encapsulation header encapsulation header field, and a protocol data unit header PDU header field.

In another solution in accordance with the disclosure, the information used to identify the session between the UE and the target node includes at least one of a bearer identifier, a flow identifier, a Media Access Control identifier of hardware, a session identifier, an Internet Protocol address of the UE, an IP address of the access network device, an access network identifier of an access network to which the access network device is connected, an IP address of the UE, a quality of service identifier, an international mobile subscriber identity, an international mobile equipment identity, an Internet Protocol multimedia private identity, an IP multimedia public identity, a temporary mobile subscriber identity, a mobile phone number of the UE, and a globally unique temporary user equipment identity of the UE.

In another solution in accordance with the disclosure, the target node includes a user plane-gateway in the core network, or a service server in the core network, or a server that is on the Internet and that has established a communication connection to a network element in the core network.

It should be noted that for some implementations of the units, further refer to corresponding descriptions of the method embodiments shown in FIG. 3, FIG. 8, FIG. 9, and FIG. 10 correspondingly.

In the access network device described in FIG. 13, the UE and the AN negotiate the air interface protection key in advance, and then use the air interface protection key to protect a field that is included in a protocol data unit and that includes information used to identify a session between the UE and a user plane-gateway in the core network, so that an attacker cannot easily obtain the information used to identify the session between the UE and the user plane-gateway in the core network in an air interface stage, and the attacker cannot determine the session based on the information, thereby preventing the session from being attacked.

Figure 14:
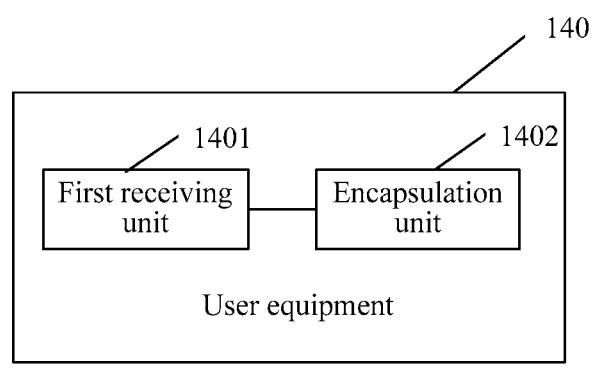
FIG. 14 is a schematic structural diagram of another user equipment according to an embodiment of the present invention.

FIG. 14 is a schematic structural diagram of another user equipment 140 according to an embodiment of the present invention. The user equipment 140 may include a first receiving unit 1401 and an encapsulation unit 1402. The units are described below in detail.

The first receiving unit 1401 is configured to: receive correspondence information sent by an access network device AN, and determine, based on the correspondence information, that a target session corresponds to a target identifier, where the target identifier is generated by the AN, the target session is a session between the UE and a target node, and data of the target session needs to pass through the AN during transmission.

The encapsulation unit 1402 is configured to: encapsulate the target identifier in an uplink protocol data unit PDU of the target session, and send the uplink protocol data unit with the encapsulated target identifier to the AN, where the AN is configured to: replace the target identifier in the uplink protocol data unit with a reference identifier, and send the uplink protocol data unit obtained after the replacement to the target node, and the reference identifier is used for the target node to determine that the uplink protocol data unit belongs to the target session.

By running the foregoing units, a session protection mechanism is set in an air interface transmission stage between the UE and the AN. To be specific, after a target session is established between the UE and an UP-GW, the AN and the UE agree on a target identifier used to identify the target session. During transmission of a subsequent packet in an air interface stage, the target identifier is used in the packet to indicate that the packet is from the target session. The target identifier is replaced with a reference identifier (a device other than the AN and the UE can also determine the target session by using the reference identifier) during communication with a core network. In this way, the device other than the AN and the UE cannot deduce that the packet belongs to the target session even if the device has intercepted the target identifier, so that the session is prevented from being attacked.

In an optional solution, the user equipment further includes a second receiving unit. The second receiving unit is configured to: receive a downlink protocol data unit sent by the AN, and determine, based on the target identifier, that the downlink protocol data unit belongs to the target session, where the AN is configured to: when the downlink protocol data unit sent by the target node is received, replace the reference identifier in the downlink protocol data unit with the target identifier, and send the downlink protocol data unit obtained after the replacement to the UE, and the downlink protocol data unit sent by the target node includes the reference identifier to indicate that the downlink protocol data unit belongs to the target session.

In another solution in accordance with the disclosure, the reference identifier is encapsulated in at least one of an outer IP header outer IP header field, an encapsulation header encapsulation header field, and a protocol data unit header PDU header field.

In another solution in accordance with the disclosure, the reference identifier includes at least one of a bearer identifier, a flow identifier, a Media Access Control identifier of hardware, a session identifier, an Internet Protocol address of the UE, an IP address of the access network device, an access network identifier of an access network to which the access network device is connected, an IP address of the UE, a quality of service identifier, an international mobile subscriber identity, an international mobile equipment identity, an Internet Protocol multimedia private identity, an IP multimedia public identity, a temporary mobile subscriber identity, a mobile phone number of the UE, and a globally unique temporary user equipment identity of the UE.

In another solution in accordance with the disclosure, the target node includes a user plane-gateway in the core network, or a service server in the core network, or a server that is on the Internet and that has established a communication connection to a network element in the core network.

It should be noted that for specific implementations of the units, further refer to the corresponding description of the method embodiment shown in FIG. 11 correspondingly.

In the user equipment described in FIG. 14, a session protection mechanism is set in an air interface transmission stage between the UE and the AN. To be specific, after a target session is established between the UE and an UP-GW, the AN and the UE agree on a target identifier used to identify the target session. During transmission of a subsequent packet in an air interface stage, the target identifier is used in the packet to indicate that the packet is from the target session. The target identifier is replaced with a reference identifier (a device other than the AN and the UE can also determine the target session by using the reference identifier) during communication with a core network. In this way, the device other than the AN and the UE cannot deduce that the packet belongs to the target session even if the device has intercepted the target identifier, so that the session is prevented from being attacked.

Figure 15:
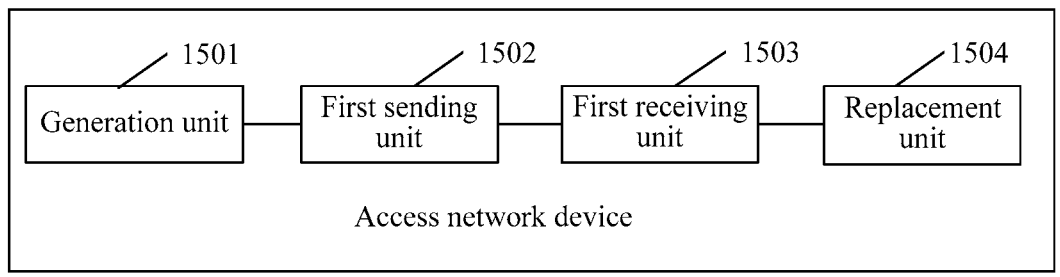
FIG. 15 is a schematic structural diagram of another access network device according to an embodiment of the present invention.

FIG. 15 is a schematic structural diagram of another access network device 150 according to an embodiment of the present invention. The access network device 150 may include a generation unit 1501, a first sending unit 1502, a first receiving unit 1503, and a replacement unit 1504. The units are described below in detail.

The generation unit 1501 is configured to generate a target identifier corresponding to a target session, where the target session is a session between user equipment UE and a target node, and data of the target session needs to pass through the AN during transmission.

The first sending unit 1502 is configured to send correspondence information to the UE, so that the UE encapsulates the target identifier in an uplink protocol data unit PDU of the target session, where the correspondence information indicates a correspondence between the target session and the target identifier.

The first receiving unit 1503 is configured to receive the uplink protocol data unit with the encapsulated target identifier that is sent by the UE.

The replacement unit 1504 is configured to: replace the target identifier in the uplink protocol data unit with a reference identifier, and send the uplink protocol data unit obtained after the replacement to the target node, where the reference identifier is used for the target node to determine that the uplink protocol data unit belongs to the target session.

By running the foregoing units, a session protection mechanism is set in an air interface transmission stage between the UE and the AN. To be specific, after a target session is established between the UE and an UP-GW, the AN and the UE agree on a target identifier used to identify the target session. During transmission of a subsequent packet in an air interface stage, the target identifier is used in the packet to indicate that the packet is from the target session. The target identifier is replaced with a reference identifier (a device other than the AN and the UE can also determine the target session by using the reference identifier) during communication with a core network. In this way, the device other than the AN and the UE cannot deduce that the packet belongs to the target session even if the device has intercepted the target identifier, so that the session is prevented from being attacked.

In another solution in accordance with the disclosure, the access network device further includes:

a second receiving unit, configured to receive a downlink protocol data unit sent by the target node, where the downlink protocol data unit includes the reference identifier to indicate that the downlink protocol data unit belongs to the target session; and a second sending unit, configured to: replace the reference identifier in the downlink protocol data unit with the target identifier, and send the downlink protocol data unit obtained after the replacement to the UE, so that the UE determines, based on the target identifier, that the downlink protocol data unit belongs to the target session.

In another optional solution, the reference identifier is encapsulated in at least one of an outer IP header outer IP header field, an encapsulation header encapsulation header field, and a protocol data unit header PDU header field.

In another optional solution, the reference identifier includes at least one of a bearer identifier, a flow identifier, a Media Access Control identifier of hardware, a session identifier, an Internet Protocol address of the UE, an IP address of the access network device, an access network identifier of an access network to which the access network device is connected, an IP address of the UE, a quality of service identifier, an international mobile subscriber identity, an international mobile equipment identity, an Internet Protocol multimedia private identity, an IP multimedia public identity, a temporary mobile subscriber identity, a mobile phone number of the UE, and a globally unique temporary user equipment identity of the UE.

In another optional solution, the target node includes a user plane-gateway in the core network, or a service server in the core network, or a server that is on the Internet and that has established a communication connection to a network element in the core network.

It should be noted that for specific implementations of the units, further refer to the corresponding description of the method embodiment shown in FIG. 12 correspondingly.

In the access network device described in FIG. 15, a session protection mechanism is set in an air interface transmission stage between the UE and the AN. To be specific, after a target session is established between the UE and an UP-GW, the AN and the UE agree on a target identifier used to identify the target session. During transmission of a subsequent packet in an air interface stage, the target identifier is used in the packet to indicate that the packet is from the target session. The target identifier is replaced with a reference identifier (a device other than the AN and the UE can also determine the target session by using the reference identifier) during communication with a core network. In this way, the device other than the AN and the UE cannot deduce that the packet belongs to the target session even if the device has intercepted the target identifier, so that the session is prevented from being attacked.

Figure 16:
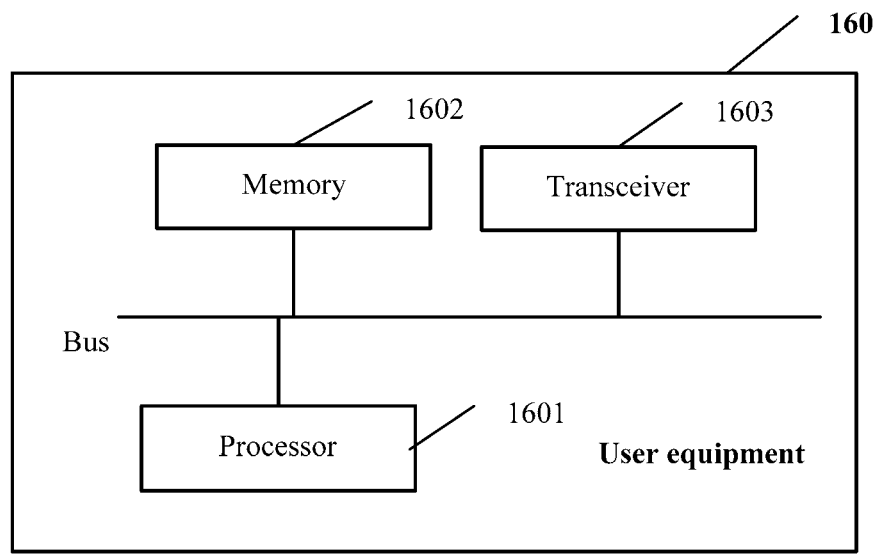
FIG. 16 is a schematic structural diagram of another user equipment according to an embodiment of the present invention.

FIG. 16 shows user equipment 160 according to an embodiment of the present invention. The user equipment 160 includes a processor 1601, a memory 1602, and a transceiver 1603. The processor 1601, the memory 1602, and the transceiver 1603 are connected to each other by using a bus.

The memory 1602 includes but is not limited to a random-access memory (RAM), a read-only memory (ROM), an erasable programmable read-only memory (EPROM or flash memory), or a portable read-only memory (CD-ROM), and the memory 1602 is used for a related instruction and data.

The transceiver 1603 may include a receiver and a transmitter, for example, a radio frequency module. That the processor 1601 receives or sends a protocol data unit described below may be In some embodiments understood as that the processor 1601 receives or sends the protocol data unit by using the transceiver.

The processor 1601 may be one or more central processing units (English: Central Processing Unit, CPU for short). If the processor 1601 has one CPU, the CPU may be a single-core CPU or a multi-core CPU.

The processor 1601 in the user equipment 160 is configured to read program code stored in the memory 1602 to perform the following operations:

processing a base key according to a preset rule to generate an air interface protection key, where the base key is a key generated from two-way authentication between the UE and a core network or a key derived from the key generated from the two-way authentication, and a key management device in the core network is configured to send the base key to an access network device AN, so that the AN processes the base key according to the preset rule to generate the air interface protection key;

protecting a target field in an uplink protocol data unit PDU by using the air interface protection key, where the target field includes information used to identify a session between the UE and a target node, and data of the session between the target node and the UE needs to pass through the AN during transmission; and sending the uplink protocol data unit with the protected target field to the AN, so that the AN parses the target field in the uplink protocol data unit by using the air interface protection key.

By performing the foregoing operations, the UE and the AN negotiate the air interface protection key in advance, and then use the air interface protection key to protect a field that is included in a protocol data unit and that includes information used to identify a session between the UE and a user plane-gateway in the core network, so that an attacker cannot easily obtain the information used to identify the session between the UE and the user plane-gateway in the core network in an air interface stage, and the attacker cannot determine the session based on the information, thereby preventing the session from being attacked.

In an optional solution, after processing the base key according to the preset rule to generate the air interface protection key, the processor 1601 is further configured to: receive a downlink protocol data unit sent by the AN, and parse a target field in the downlink protocol data unit by using the air interface protection key, where the target field in the downlink protocol data unit has been encrypted by using the air interface protection key.

In another optional solution, that the processor 1601 parses the target field in the downlink protocol data unit by using the air interface protection key is In some embodiments: parsing the target field in the downlink protocol data unit by using the air interface protection key according to a rule defined in an air interface policy obtained in advance, where the target field in the downlink protocol data unit has been protected by the AN by using the air interface protection key according to the rule defined in the air interface policy obtained in advance, and a use rule of a key is defined in the air interface policy.

In another optional solution, that the processor 1601 protects the target field in the uplink protocol data unit PDU by using the air interface protection key is In some embodiments:

protecting the target field in the uplink protocol data unit by using the air interface protection key according to a rule defined in an air interface policy obtained in advance, where the AN is configured to parse the target field by using the air interface protection key according to the rule defined in the air interface policy obtained in advance, and a use rule of a key is defined in the air interface policy.

In another optional solution, the processor 1601 is further configured to receive the air interface policy sent by the AN, where the air interface policy is generated by the AN according to an initial security policy, a generation rule of a key used in a target session is defined in the initial security policy, and the target session is the session between the target node and the UE.

In another optional solution, before protecting the target field in an uplink protocol data unit PDU by using the air interface protection key, the processor 1601 is further configured to: determine whether a payload field in the uplink protocol data unit is protected; and if the payload field in the uplink protocol data unit is not protected, protect the uplink protocol data unit by using the air interface protection key; or if the payload field in the uplink protocol data unit is protected, perform the operation of protecting a target field in an uplink protocol data unit PDU by the UE by using the air interface protection key.

In another optional solution, the air interface protection key includes at least one of an encryption key and an integrity protection key.

In another optional solution, the target field includes at least one of an outer IP header outer IP header field, an encapsulation header encapsulation header field, and a protocol data unit header PDU header field.

In another optional solution, the information used to identify the session between the UE and the target node includes at least one of a bearer identifier, a flow identifier, a Media Access Control identifier of hardware, a session identifier, an Internet Protocol address of the UE, an IP address of the access network device, an access network identifier of an access network to which the access network device is connected, an IP address of the UE, a quality of service identifier, an international mobile subscriber identity, an international mobile equipment identity, an Internet Protocol multimedia private identity, an IP multimedia public identity, a temporary mobile subscriber identity, a mobile phone number of the UE, and a globally unique temporary user equipment identity of the UE.

In another solution in accordance with the disclosure, the target node includes a user plane-gateway in the core network, or a service server in the core network, or a server that is on the Internet and that has established a communication connection to a network element in the core network.

It should be noted that for specific implementations of the operations, further refer to corresponding descriptions of the method embodiments shown in FIG. 3, FIG. 8, FIG. 9, and FIG. 10 correspondingly.

In the user equipment described in FIG. 16, the UE and the AN negotiate the air interface protection key in advance, and then use the air interface protection key to protect a field that is included in a protocol data unit and that includes information used to identify a session between the UE and a user plane-gateway in the core network, so that an attacker cannot easily obtain the information used to identify the session between the UE and the user plane-gateway in the core network in an air interface stage, and the attacker cannot determine the session based on the information, thereby preventing the session from being attacked.

Figure 17:
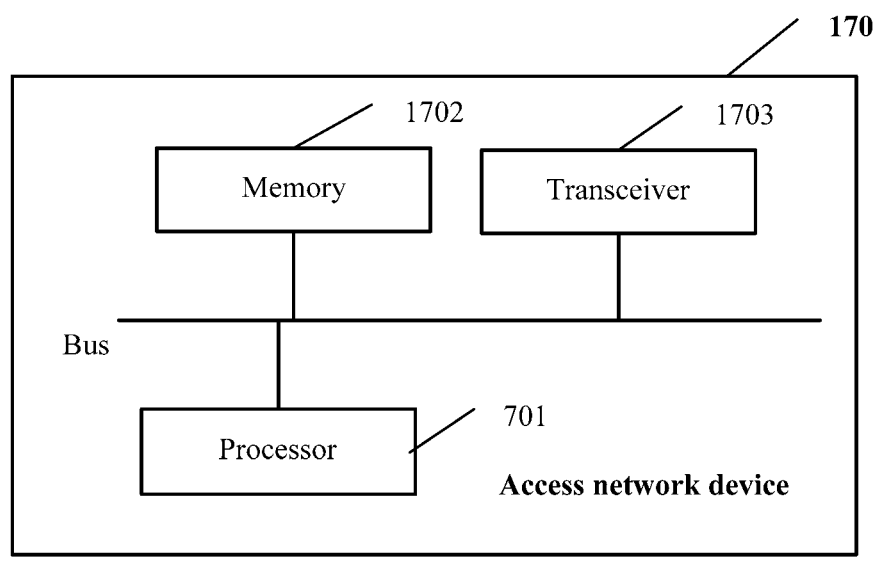
FIG. 17 is a schematic structural diagram of another access network device according to an embodiment of the present invention.

FIG. 17 shows an access network device 170 according to an embodiment of the present invention. The access network device 170 includes a processor 1701, a memory 1702, and a transceiver 1703. The processor 1701, the memory 1702, and the transceiver 1703 are connected to each other by using a bus.

The memory 1702 includes but is not limited to a random-access memory (RAM), a read-only memory (ROM), an erasable programmable read-only memory (EPROM or flash memory), or a portable read-only memory (CD-ROM), and the memory 1702 is used for a related instruction and data.

The transceiver 1703 may include a receiver and a transmitter, for example, a radio frequency module. That the processor 1701 receives or sends a protocol data unit described below may be In some embodiments understood as that the processor 1701 receives or sends the protocol data unit by using the transceiver.

The processor 1701 may be one or more central processing units (English: Central Processing Unit, CPU for short). If the processor 1701 has one CPU, the CPU may be a single-core CPU or a multi-core CPU.

The processor 1701 in the access network device 170 is configured to read program code stored in the memory 1702 to perform the following operations:

receiving a base key sent by a key management device in a core network, where the base key is a key generated from two-way authentication between user equipment UE and the core network or a key derived from the key generated from the two-way authentication, and the UE is configured to process the base key according to a preset rule to generate an air interface protection key;

processing the base key according to the preset rule to generate the air interface protection key; and receiving an uplink protocol data unit sent by the UE, and parsing a target field in the uplink protocol data unit by using the air interface protection key, where the target field in the uplink protocol data unit has been protected by the UE by using the air interface protection key, the target field includes information used to identify a session between the UE and a target node, and data of the session between the target node and the UE needs to pass through the AN during transmission.

By performing the foregoing operations, the UE and the AN negotiate the air interface protection key in advance, and then use the air interface protection key to protect a field that is included in a protocol data unit and that includes information used to identify a session between the UE and a user plane-gateway in the core network, so that an attacker cannot easily obtain the information used to identify the session between the UE and the user plane-gateway in the core network in an air interface stage, and the attacker cannot determine the session based on the information, thereby preventing the session from being attacked.

In an optional solution, after processing the base key according to the preset rule to generate the air interface protection key, the processor 1701 is further configured to: protect a target field in a downlink protocol data unit by using the air interface protection key, and send the downlink protocol data unit with the protected target field to the UE, so that the UE parses the target field in the downlink protocol data unit by using the air interface protection key.

In another optional solution, before protecting the target field in the downlink protocol data unit by using the air interface protection key, the processor is further configured to: determine whether a payload field in the downlink protocol data unit is protected; and if the payload field in the downlink protocol data unit is not protected, protect the downlink protocol data unit by using the air interface protection key; or if the payload field in the downlink protocol data unit is not protected, perform the operation of protecting a target field in a downlink protocol data unit by using the air interface protection key.

In another optional solution, that the processor 1701 protects the target field in the downlink protocol data unit by using the air interface protection key is In some embodiments: protecting the target field in the downlink protocol data unit by using the air interface protection key according to a rule defined in an air interface policy obtained in advance, where the UE is configured to parse the target field in the downlink protocol data unit by using the air interface protection key according to the rule defined in the air interface policy obtained in advance, and a use rule of a key is defined in the air interface policy.

In another optional solution, that the processor parses the target field in the uplink protocol data unit by using the air interface protection key is In some embodiments: parsing the target field in the uplink protocol data unit by using the air interface protection key according to a rule defined in an air interface policy obtained in advance, where the target field in the uplink protocol data unit has been protected by the UE by using the air interface protection key according to the rule defined in the air interface policy obtained in advance, and a use rule of a key is defined in the air interface policy.

In another optional solution, the processor is further configured to: receive an initial security policy from the core network, where a generation rule of a key used in a target session is defined in the initial security policy, and the target session is the session between the target node and the UE; and generate an air interface policy according to the initial security policy, and send the air interface policy to the UE.

In another optional solution, the air interface protection key includes at least one of an encryption key and an integrity protection key.

In another optional solution, the target field includes at least one of an outer IP header outer IP header field, an encapsulation header encapsulation header field, and a protocol data unit header PDU header field.

In another optional solution, the information used to identify the session between the UE and the target node includes at least one of a bearer identifier, a flow identifier, a Media Access Control identifier of hardware, a session identifier, an Internet Protocol address of the UE, an IP address of the access network device, an access network identifier of an access network to which the access network device is connected, an IP address of the UE, a quality of service identifier, an international mobile subscriber identity, an international mobile equipment identity, an Internet Protocol multimedia private identity, an IP multimedia public identity, a temporary mobile subscriber identity, a mobile phone number of the UE, and a globally unique temporary user equipment identity of the UE.

In another optional solution, the target node includes a user plane-gateway in the core network, or a service server in the core network, or a server that is on the Internet and that has established a communication connection to a network element in the core network.

It should be noted that for specific implementations of the operations, further refer to corresponding descriptions of the method embodiments shown in FIG. 3, FIG. 8, FIG. 9, and FIG. 10 correspondingly.

In the access network device described in FIG. 17, the UE and the AN negotiate the air interface protection key in advance, and then use the air interface protection key to protect a field that is included in a protocol data unit and that includes information used to identify a session between the UE and a user plane-gateway in the core network, so that an attacker cannot easily obtain the information used to identify the session between the UE and the user plane-gateway in the core network in an air interface stage, and the attacker cannot determine the session based on the information, thereby preventing the session from being attacked.

Figure 18:
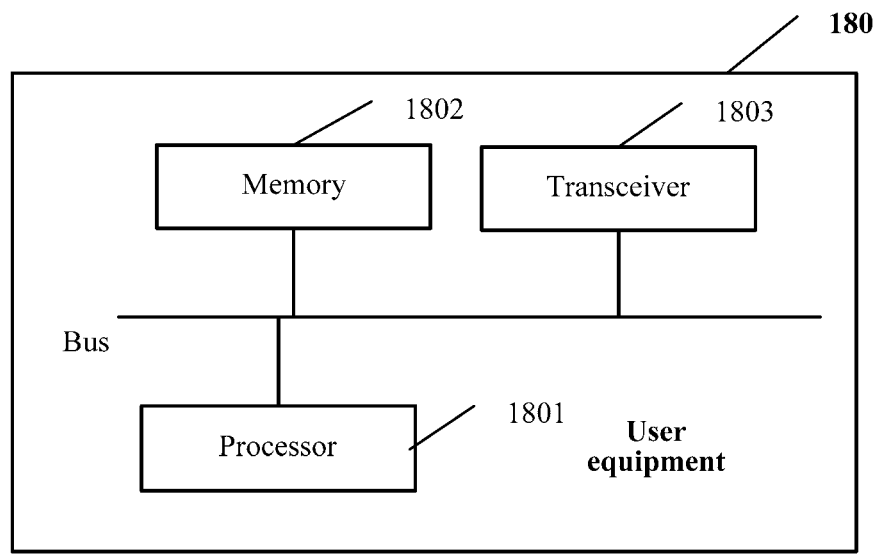
FIG. 18 is a schematic structural diagram of another user equipment according to an embodiment of the present invention.

FIG. 18 shows user equipment 180 according to an embodiment of the present invention. The user equipment 180 includes a processor 1801, a memory 1802, and a transceiver 1803. The processor 1801, the memory 1802, and the transceiver 1803 are connected to each other by using a bus.

The memory 1802 includes but is not limited to a random-access memory (RAM), a read-only memory (ROM), an erasable programmable read-only memory (EPROM or flash memory), or a portable read-only memory (CD-ROM), and the memory 1802 is used for a related instruction and data.

The transceiver 1803 may include a receiver and a transmitter, for example, a radio frequency module. That the processor 1801 receives or sends a protocol data unit described below may be In some embodiments understood as that the processor 1801 receives or sends the protocol data unit by using the transceiver.

The processor 1801 may be one or more central processing units (English: Central Processing Unit, CPU for short). If the processor 1801 has one CPU, the CPU may be a single-core CPU or a multi-core CPU.

The processor 1801 in the user equipment 180 is configured to read program code stored in the memory 1802 to perform the following operations:

receiving correspondence information sent by an access network device AN, and determining, based on the correspondence information, that a target session corresponds to a target identifier, where the target identifier is generated by the AN, the target session is a session between the UE and a target node, and data of the target session needs to pass through the AN during transmission; and encapsulating the target identifier in an uplink protocol data unit PDU of the target session, and sending the uplink protocol data unit with the encapsulated target identifier to the AN, where the AN is configured to: replace the target identifier in the uplink protocol data unit with a reference identifier, and send the uplink protocol data unit obtained after the replacement to the target node, and the reference identifier is used for the target node to determine that the uplink protocol data unit belongs to the target session.

By performing the foregoing operations, a session protection mechanism is set in an air interface transmission stage between the UE and the AN. To be specific, after a target session is established between the UE and an UP-GW, the AN and the UE agree on a target identifier used to identify the target session. During transmission of a subsequent packet in an air interface stage, the target identifier is used in the packet to indicate that the packet is from the target session. The target identifier is replaced with a reference identifier (a device other than the AN and the UE can also determine the target session by using the reference identifier) during communication with a core network. In this way, the device other than the AN and the UE cannot deduce that the packet belongs to the target session even if the device has intercepted the target identifier, so that the session is prevented from being attacked.

In an optional solution, after receiving the correspondence information sent by the access network device AN and determining, based on the correspondence information, that the target session corresponds to the target identifier, the processor 1801 is further configured to: receive a downlink protocol data unit sent by the AN, and determine, based on the target identifier, that the downlink protocol data unit belongs to the target session, where the AN is configured to: when the downlink protocol data unit sent by the target node is received, replace the reference identifier in the downlink protocol data unit with the target identifier, and send the downlink protocol data unit obtained after the replacement to the UE, and the downlink protocol data unit sent by the target node includes the reference identifier to indicate that the downlink protocol data unit belongs to the target session.

In another optional solution, the reference identifier is encapsulated in at least one of an outer IP header outer IP header field, an encapsulation header encapsulation header field, and a protocol data unit header PDU header field.

In another optional solution, the reference identifier includes at least one of a bearer identifier, a flow identifier, a Media Access Control identifier of hardware, a session identifier, an Internet Protocol address of the UE, an IP address of the access network device, an access network identifier of an access network to which the access network device is connected, an IP address of the UE, a quality of service identifier, an international mobile subscriber identity, an international mobile equipment identity, an Internet Protocol multimedia private identity, an IP multimedia public identity, a temporary mobile subscriber identity, a mobile phone number of the UE, and a globally unique temporary user equipment identity of the UE.

In another optional solution, the target node includes a user plane-gateway in the core network, or a service server in the core network, or a server that is on the Internet and that has established a communication connection to a network element in the core network.

It should be noted that for specific implementations of the operations, further refer to the corresponding description of the method embodiment shown in FIG. 11 correspondingly.

In the user equipment described in FIG. 18, a session protection mechanism is set in an air interface transmission stage between the UE and the AN. To be specific, after a target session is established between the UE and an UP-GW, the AN and the UE agree on a target identifier used to identify the target session. During transmission of a subsequent packet in an air interface stage, the target identifier is used in the packet to indicate that the packet is from the target session. The target identifier is replaced with a reference identifier (a device other than the AN and the UE can also determine the target session by using the reference identifier) during communication with a core network. In this way, the device other than the AN and the UE cannot deduce that the packet belongs to the target session even if the device has intercepted the target identifier, so that the session is prevented from being attacked.

Figure 19:
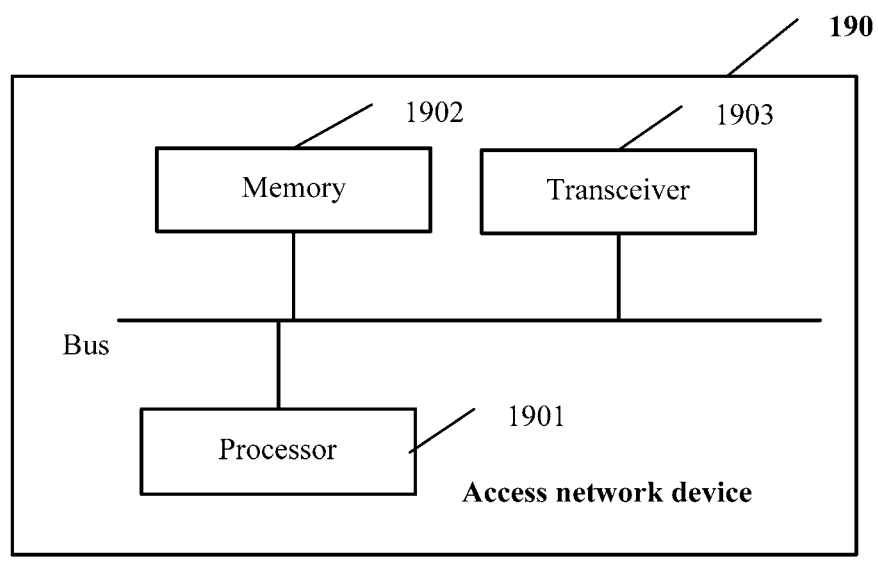
FIG. 19 is a schematic structural diagram of another access network device according to an embodiment of the present invention.

FIG. 19 shows an access network device 190 according to an embodiment of the present invention. The access network device 190 includes a processor 1901, a memory 1902, and a transceiver 1903. The processor 1901, the memory 1902, and the transceiver 1903 are connected to each other by using a bus.

The memory 1902 includes but is not limited to a random-access memory (RAM), a read-only memory (ROM), an erasable programmable read-only memory (EPROM or flash memory), or a portable read-only memory (CD-ROM), and the memory 1902 is used for a related instruction and data.

The transceiver 1903 may include a receiver and a transmitter, for example, a radio frequency module. That the processor 1901 receives or sends a protocol data unit described below may be In some embodiments understood as that the processor 1901 receives or sends the protocol data unit by using the transceiver.

The processor 1901 may be one or more central processing units (English: Central Processing Unit, CPU for short). If the processor 1901 has one CPU, the CPU may be a single-core CPU or a multi-core CPU.

The processor 1901 in the access network device 190 is configured to read program code stored in the memory 1902 to perform the following operations:

generating a target identifier corresponding to a target session, where the target session is a session between user equipment UE and a target node, and data of the target session needs to pass through the AN during transmission;

sending correspondence information to the UE, so that the UE encapsulates the target identifier in an uplink protocol data unit PDU of the target session, where the correspondence information indicates a correspondence between the target session and the target identifier;

receiving the uplink protocol data unit with the encapsulated target identifier that is sent by the UE; and replacing the target identifier in the uplink protocol data unit with a reference identifier, and sending the uplink protocol data unit obtained after the replacement to the target node, where the reference identifier is used for the target node to determine that the uplink protocol data unit belongs to the target session.

By performing the foregoing operations, a session protection mechanism is set in an air interface transmission stage between the UE and the AN. To be specific, after a target session is established between the UE and an UP-GW, the AN and the UE agree on a target identifier used to identify the target session. During transmission of a subsequent packet in an air interface stage, the target identifier is used in the packet to indicate that the packet is from the target session. The target identifier is replaced with a reference identifier (a device other than the AN and the UE can also determine the target session by using the reference identifier) during communication with a core network. In this way, the device other than the AN and the UE cannot deduce that the packet belongs to the target session even if the device has intercepted the target identifier, so that the session is prevented from being attacked.

In an optional solution, after sending the correspondence information to the UE, the processor 1901 is further configured to:

receive a downlink protocol data unit sent by the target node, where the downlink protocol data unit includes the reference identifier to indicate that the downlink protocol data unit belongs to the target session; and replace, by the AN, the reference identifier in the downlink protocol data unit with the target identifier, and send the downlink protocol data unit obtained after the replacement to the UE, so that the UE determines, based on the target identifier, that the downlink protocol data unit belongs to the target session.

In another optional solution, the reference identifier is encapsulated in at least one of an outer IP header outer IP header field, an encapsulation header encapsulation header field, and a protocol data unit header PDU header field.

In another optional solution, the reference identifier includes at least one of a bearer identifier, a flow identifier, a Media Access Control identifier of hardware, a session identifier, an Internet Protocol address of the UE, an IP address of the access network device, an access network identifier of an access network to which the access network device is connected, an IP address of the UE, a quality of service identifier, an international mobile subscriber identity, an international mobile equipment identity, an Internet Protocol multimedia private identity, an IP multimedia public identity, a temporary mobile subscriber identity, a mobile phone number of the UE, and a globally unique temporary user equipment identity of the UE.

In another optional solution, the target node includes a user plane-gateway in the core network, or a service server in the core network, or a server that is on the Internet and that has established a communication connection to a network element in the core network.

It should be noted that for specific implementations of the operations, further refer to the corresponding description of the method embodiment shown in FIG. 11 correspondingly.

In the access network device described in FIG. 19, a session protection mechanism is set in an air interface transmission stage between the UE and the AN. To be specific, after a target session is established between the UE and an UP-GW, the AN and the UE agree on a target identifier used to identify the target session. During transmission of a subsequent packet in an air interface stage, the target identifier is used in the packet to indicate that the packet is from the target session. The target identifier is replaced with a reference identifier (a device other than the AN and the UE can also determine the target session by using the reference identifier) during communication with a core network. In this way, the device other than the AN and the UE cannot deduce that the packet belongs to the target session even if the device has intercepted the target identifier, so that the session is prevented from being attacked.

In conclusion, by implementing the embodiments of the present invention, the UE and the AN negotiate the air interface protection key in advance, and then use the air interface protection key to protect a field that is included in a protocol data unit and that includes information used to identify a session between the UE and a user plane-gateway in the core network, so that an attacker cannot easily obtain the information used to identify the session between the UE and the user plane-gateway in the core network in an air interface stage, and the attacker cannot determine the session based on the information, thereby preventing the session from being attacked.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments can be performed. The foregoing storage medium includes: any medium that can store program code, such as a ROM, a RAM, a magnetic disk, or an optical disc.

The invention claimed is:

1. A communications system, wherein the communications system comprises an access network (AN) device and user equipment (UE), wherein
the AN device is configured to receive a base key sent by a key management device in a core network, wherein the base key is a key generated from two-way authentication between the UE and the core network or a key derived from the key generated from the two-way authentication;
the AN device and the UE are both configured to process the base key according to a preset rule to generate an air interface protection key;
the UE is further configured to: protect a target field in an uplink protocol data unit (PDU) by using the air interface protection key, and send the uplink PDU having the protected target field to the AN device, wherein the target field comprises information identifying a session between the UE and a target node, and data of the session between the target node and the UE is to pass through the AN during transmission; and
the AN is configured to: receive the uplink PDU, and parse the target field in the uplink PDU using the air interface protection key.

2. The system according to claim 1, wherein
the AN device is configured to: protect a target field in a downlink PDU using the air interface protection key, and send the downlink PDU having the protected target field to the UE; and
the UE is configured to: receive the downlink PDU, and parse the target field in the downlink PDU using the air interface protection key.

3. The system according to claim 2, wherein
protecting the target field in the downlink protocol data unit using the air interface protection key comprises: protecting the target field in the downlink protocol data unit using the air interface protection key according to a priori-obtained rule defined in an air interface policy, wherein a use rule of a key is defined in the air interface policy; and
parsing the target field in the downlink protocol data unit using the air interface protection key comprises: parsing the target field in the downlink protocol data unit using the air interface protection key according to the rule defined in the air interface policy obtained in advance.

4. The system according to claim 1, wherein
protecting the target field in the uplink PDU using the air interface protection key comprises: protecting the target field in the uplink PDU using the air interface protection key according to a priori-obtained rule defined in an air interface policy, wherein a use rule of a key is defined in the air interface policy; and
parsing the target field in the uplink protocol data unit using the air interface protection key comprises: parsing the target field in the uplink protocol data unit using the air interface protection key according to the rule defined in the air interface policy obtained in advance.

5. The system according to claim 3, wherein
the AN device is configured to receive an initial security policy from the core network, wherein a generation rule of a key used in a target session is defined in the initial security policy, and the target session is a session between the target node and the UE;
the AN device is configured to generate the air interface policy according to the initial security policy;
the AN device is configured to send the air interface policy to the UE; and
the UE is configured to receive the air interface policy.

6. The system according to claim 1, wherein
the UE is further configured to
determine whether a PDU payload field in the uplink protocol data unit is protected; and
if the PDU payload field in the uplink protocol data unit is not protected, protect the uplink protocol data unit by using the air interface protection key.

7. The system according to claim 1, wherein
the AN is further configured to determine whether a PDU payload field in a downlink protocol data unit is protected; and
if the PDU payload field in the downlink protocol data unit is not protected, the AN is configured to protect the downlink protocol data unit by using the air interface protection key.

8. The system according claim 1, wherein the air interface protection key comprises at least one of an encryption key or an integrity protection key.

9. The system according to claim 1, wherein the target field comprises at least one of an outer IP header outer IP header field, an encapsulation header encapsulation header field, and a protocol data unit header PDU header field.

10. The system according to claim 1, wherein the information identifying the session between the UE and the target node comprises at least one of a bearer identifier, a flow identifier, a Media Access Control identifier of hardware, a session identifier, an Internet Protocol address of the UE, an IP address of the access network device, an access network identifier of an access network to which the access network device is connected, an IP address of the UE, a quality of service identifier, an international mobile subscriber identity, an international mobile equipment identity, an Internet Protocol multimedia private identity, an IP multimedia public identity, a temporary mobile subscriber identity, a mobile phone number of the UE, or a globally unique temporary user equipment identity of the UE.

11. User equipment (UE), comprising:
a generation unit, configured to process a base key according to a preset rule to generate an air interface protection key, wherein the base key is a key generated from two-way authentication between the UE and a core network or a key derived from the key generated from the two-way authentication, wherein a key management device in the core network is configured to send the base key to an access network (AN) device to facilitate the AN device to processes the base key according to the preset rule to generate the air interface protection key;
a protection unit, configured to protect a target field in an uplink protocol data unit (PDU) using the air interface protection key, wherein the target field comprises information identifying a session between the UE and a target node, and data of the session between the target node and the UE is to pass through the AN during transmission; and
a sending unit, configured to send the uplink PDU having the protected target field to the AN device to facilitate the AN device to parse the target field in the uplink protocol data unit using the air interface protection key.

12. The user equipment according to claim 11, further comprising:
a first receiving unit, configured to: receive, by the UE, a downlink PDU sent by the AN, and parse a target field in the downlink PDU using the air interface protection key, wherein the target field in the downlink PDU has been encrypted using the air interface protection key.

13. The user equipment according to claim 12, wherein parsing by the first receiving unit the target field in the downlink PDU using the air interface protection key comprises:
parsing the target field in the downlink PDU using the air interface protection key according to a priori-obtained rule defined in an air interface policy, wherein the target field in the downlink PDU has been protected by the AN device using the air interface protection key according to the priori-obtained rule defined in the air interface policy, and a use rule of a key is defined in the air interface policy.

14. An access network (AN) device, comprising:
a first receiving unit, configured to receive a base key sent by a key management device in a core network, wherein the base key is a key generated from two-way authentication between user equipment (UE) and the core network or a key derived from the key generated from the two-way authentication, and the UE is configured to process the base key according to a preset rule to generate an air interface protection key;
a generation unit, configured to process the base key according to the preset rule to generate the air interface protection key; and
a second receiving unit, configured to: receive an uplink PDU sent by the UE, and parse a target field in the uplink PDU using the air interface protection key, wherein the target field in the uplink PDU has been protected by the UE using the air interface protection key, the target field comprises information identifying a session between the UE and a target node, and data of the session between the target node and the UE is to pass through the AN during transmission.

15. The access network device according to claim 14, further comprising:
a protection unit, configured to: protect a target field in a downlink protocol data unit (PDU) using the air interface protection key, and send the downlink PDU with the protected target field to the UE to facilitate the UE to parse the target field in the downlink PDU by using the air interface protection key.

16. A data transmission method, comprising:
processing, by user equipment UE, a base key according to a preset rule to generate an air interface protection key, wherein the base key is a key generated from two-way authentication between the UE and a core network or a key derived from the key generated from the two-way authentication, and a key management device in the core network is configured to send the base key to an access network (AN) device o facilitate the AN device processes the base key according to the preset rule to generate the air interface protection key;
protecting, by the UE, a target field in an uplink protocol data unit (PDU) by using the air interface protection key, wherein the target field comprises information identifying a session between the UE and a target node, and data of the session between the target node and the UE is to pass through the AN device during transmission; and
sending, by the UE, the uplink PDU with the protected target field to the AN device, to facilitate the AN device to parse the target field in the uplink PDU by using the air interface protection key.

17. The method according to claim 16, wherein after processing, by user equipment UE, the base key according to a preset rule to generate an air interface protection key, the method further comprises:
receiving, by the UE, a downlink PDU sent by the AN device, and parsing a target field in the downlink PDU by using the air interface protection key, wherein the target field in the downlink PDU has been encrypted by using the air interface protection key.

18. The method according to claim 17, wherein parsing the target field in the downlink PDU using the air interface protection key comprises:
parsing the target field in the downlink PDU by using the air interface protection key according to a rule defined in an air interface policy obtained in advance, wherein the target field in the downlink PDU has been protected by the AN device by using the air interface protection key according to the rule defined in the air interface policy obtained in advance, and a use rule of a key is defined in the air interface policy.

19. A data transmission method, comprising:
receiving, by an access network (AN) device, a base key sent by a key management device in a core network, wherein the base key is a key generated from two-way authentication between user equipment (UE) and the core network or a key derived from the key generated from the two-way authentication, and the UE is configured to process the base key according to a preset rule to generate an air interface protection key;
processing, by the AN device, the base key according to the preset rule to generate the air interface protection key; and
receiving, by the AN device, an uplink PDU sent by the UE, and parsing a target field in the uplink PDU by using the air interface protection key, wherein the target field in the uplink PDU has been protected by the UE by using the air interface protection key, the target field comprises information used to identify a session between the UE and a target node, and data of the session between the target node and the UE is to pass through the AN device during transmission.

20. The method according to claim 19, wherein after=processing, by the AN device, the base key according to the preset rule to generate the air interface protection key, the method further comprises:
protecting, by the AN device, a target field in a downlink PDU by using the air interface protection key, and sending the downlink PDU with the protected target field to the UE, so that the UE parses the target field in the downlink PDU by using the air interface protection key.

* * * * *

UNITED STATES PATENT AND TRADEMARK OFFICE
CERTIFICATE OF CORRECTION

Page 1 of 1

PATENT NO. : 11,228,908 B2
APPLICATION NO. : 16/400032
DATED : January 18, 2022
INVENTOR(S) : Bo Zhang et al.

It is certified that error appears in the above-identified patent and that said Letters Patent is hereby corrected as shown below:

In the Claims

Column 56, Line 51, should read as follows:
20. The method according to claim 19, wherein after processing, by the AN device, the base key according to the preset rule to generate the air interface protection key, the method further comprises: protecting, by the AN device, a target field in a downlink PDU by using the air interface protection key, and
sending the downlink PDU with the protected target field to the UE, so that the UE parses the target field in the downlink PDU by using the air interface protection key.

Signed and Sealed this
First Day of March, 2022

Drew Hirshfeld
*Performing the Functions and Duties of the*
*Under Secretary of Commerce for Intellectual Property and*
*Director of the United States Patent and Trademark Office*